United States Patent [19]
Schipper et al.

[11] Patent Number: 6,128,337
[45] Date of Patent: Oct. 3, 2000

[54] MULTIPATH SIGNAL DISCRIMINATION

[75] Inventors: John F. Schipper, Palo Alto; James M. Janky, Los Altos, both of Calif.

[73] Assignee: Trimble Navigation Limited, Sunnyvale, Calif.

[21] Appl. No.: 08/865,607

[22] Filed: May 29, 1997

[51] Int. Cl.[7] ............................... H03H 7/30; H04B 1/10
[52] U.S. Cl. .................... 375/229; 375/346; 375/349; 375/350
[58] Field of Search ..................... 375/346, 347, 375/348, 349, 350, 285, 229, 230, 231

[56] References Cited

U.S. PATENT DOCUMENTS

| | | | |
|---|---|---|---|
| 3,852,534 | 12/1974 | Tilk | 179/15 BS |
| 3,869,673 | 3/1975 | Close | 325/393 |
| 4,349,915 | 9/1982 | Costas | 375/40 |
| 4,543,657 | 9/1985 | Wilkinson | 375/1 |
| 4,582,434 | 4/1986 | Plangger et al. | 368/46 |
| 4,896,213 | 1/1990 | Kobo et al. | 358/147 |
| 5,047,859 | 9/1991 | Koo | 358/187 |
| 5,065,242 | 11/1991 | Dieterich et al. | 358/167 |
| 5,101,416 | 3/1992 | Fenton et al. | 375/1 |
| 5,111,298 | 5/1992 | Koo | 358/187 |
| 5,121,211 | 6/1992 | Koo | 358/187 |
| 5,127,051 | 6/1992 | Chan et al. | 380/49 |
| 5,130,799 | 7/1992 | Iga et al. | 358/167 |
| 5,361,102 | 11/1994 | Roy et al. | 348/611 |
| 5,402,450 | 3/1995 | Lennen | 375/343 |
| 5,408,685 | 4/1995 | Kennedy et al. | 455/65 |
| 5,493,588 | 2/1996 | Lennen | 375/343 |
| 5,600,380 | 2/1997 | Patel et al. | 348/614 |

FOREIGN PATENT DOCUMENTS 2271916A  4/1994  United Kingdom ............ H04L 25/03

OTHER PUBLICATIONS

W. Michael Bowles, "Correlation Tracking," pp. 1–53, Doctor of Science Thesis, Massachusetts Institute of Technology, Jun. 1980.

Rodger E. Ziemer and Roger and L. Peterson, "Digital Communications and Spread Spectrum Systems," pp. 419–447, Macmillan Publishing Company, 1985.

*Primary Examiner*—Stephen Chin
*Assistant Examiner*—Albert Park
*Attorney, Agent, or Firm*—John Schipper

[57] ABSTRACT

Methods for identification of, and compensation for, the effects of presence of a multipath signal in a received composite digital signal that includes a direct, distortion-free signal. A direct signal is additively or multiplicatively combined with a distinguishable indicium signal and the resultant signal is transmitted to a receiver. The indicium signal may be distinguished by use of a different frequency or by use of a bit pattern that cannot be included in a direct signal pattern. The receiver identifies the received indicium signal within the received signal, compares the received indicium signal with a reference signal that is substantially a replica of the transmitted indicium signal, determines what operations will convert the reference signal into the received indicium signal, and applies an inverse of these operations to the portion of the received signal that contains the received direct signal, to obtain an enhanced received direct signal with reduced multipath signal effects. An example of the conversion operation is discussed, which can be performed in near real time or in a post-processing mode.

30 Claims, 15 Drawing Sheets

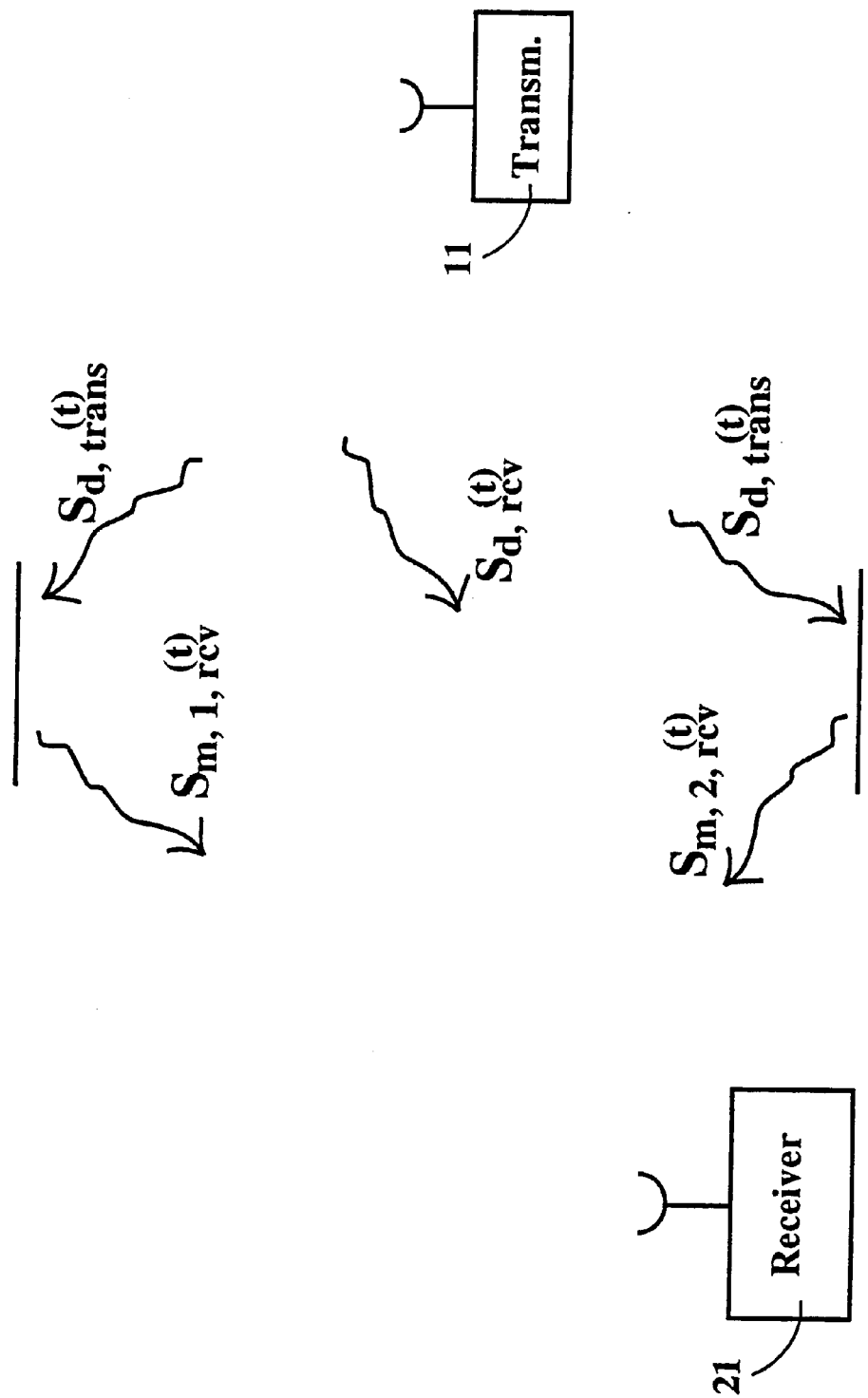

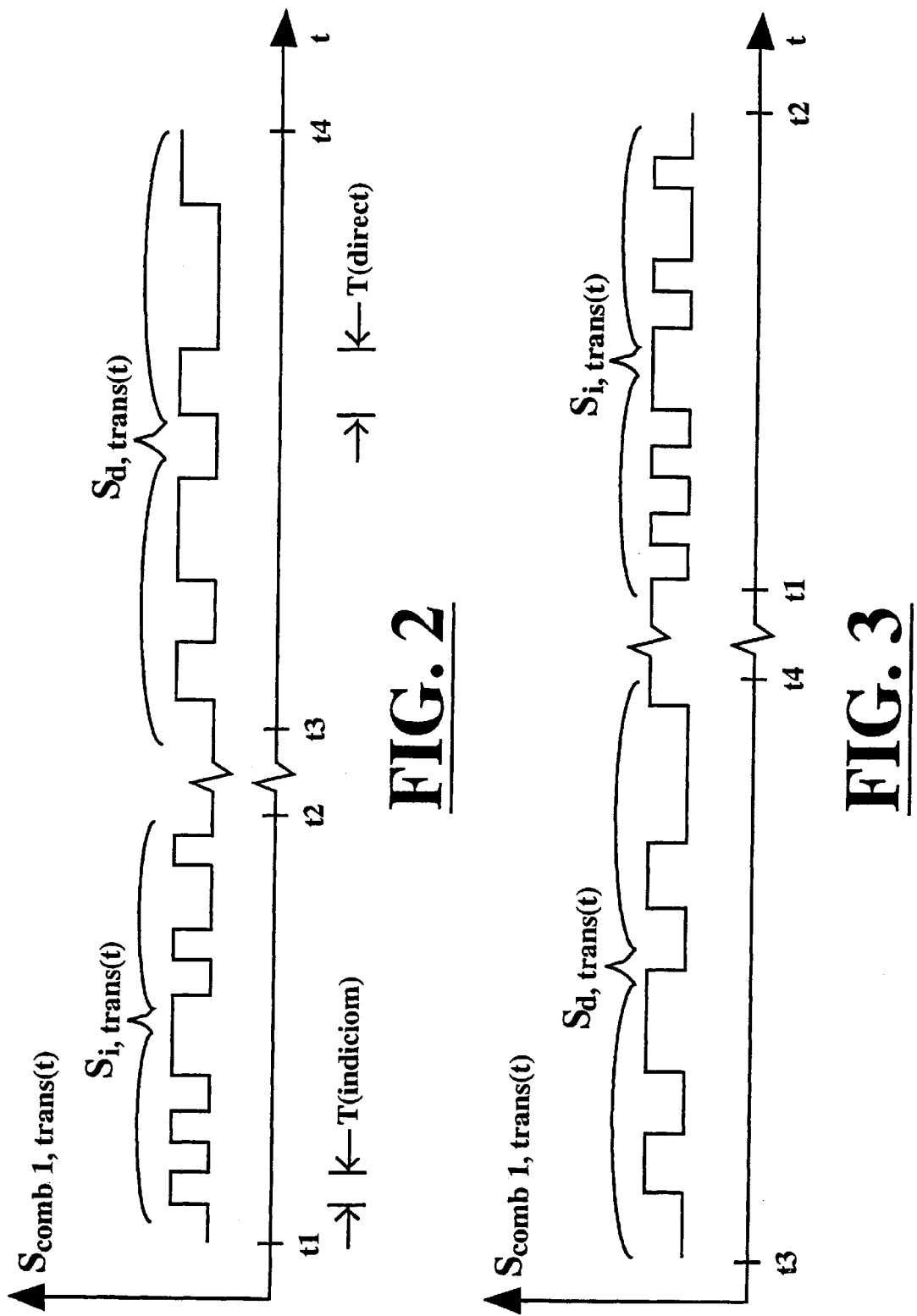

MULTIPATH SIGNAL DISCRIMINATION

FIELD OF THE INVENTION

This invention relates to discrimination between a transmitted direct signal and a multipath signal that resembles the direct signal.

BACKGROUND OF THE INVENTION

The effects of multipath are well known in the communications systems. Multipath is the term used to define the secondary signals that are locally induced reflections of a primary signal that enter the receiver in question a fraction of a second later than the direct path signal and, because of the relatively short delay between the original signal and the secondary signal, induce a type of destructive interference that results in some type of impairment to the desired signal. In analog FM band automobile receivers, the effects of multipath create an annoying flutter that causes a loss of intelligibility. In television signals, the impairment is called a "ghost" image. A similar impairment occurs in other forms of analog communication. In digital systems, whether for speech or for data transmission for other purposes, multipath basically adds noise to the desired signal, resulting in either outright errors or, much noisier data. In spread spectrum receivers, the effects of multipath are generally found in the correlators used to achieve signal timing synchronization. In certain receivers, which seek to determine location based on triangulation of range distances determined from time delay measurements made from a constellation of orbiting satellites, the effect of multipath is to induce comparatively large instantaneous errors in the time of arrival measurements which translate into large errors in the indicated positions. Removal of these errors is the subject of much of the work done by previous workers in this field. Previous researchers have sought to deal with the effects of multipath by attempting to estimate the magnitude of the error introduced, and to subtract this error or to otherwise compensate for its effects.

The methods employed to acquire and demodulate data from spread spectrum transmission is well known in the art. See R. E. Ziemer and R. L. Peterson, *Digital Communications and Spread Spectrum Systems,* Macmillan Publ. Co., New York, 1985, pp. 419–447 for a discussion of acquisitions and demodulation of spread spectrum signals. A spread spectrum GPS receiver must obtain both code and carrier synchronization in order to demodulate the desired data successfully. Issues associated with tracking and accurately demodulating a spread spectrum signal, once the signal is acquired, are discussed in many references on spread spectrum analysis, such as Ziemer and Peterson, op cit.

Signal synchronization is performed using a signal correlator. The correlator constantly compares the incoming signal with a local replica $S_d(t)$ of the desired signal; a microprocessor adjusts a time shift $\tau$ of the local replica signal until satisfactory agreement is obtained. Because the incoming signal and the local replica signal are substantially identical, a measure of the degree of agreement of these two signals is often referred to as an autocorrelation function. A variety of autocorrelation functions $AC(\tau)$ are shown in various texts. An autocorrelation function $AC(\tau)$ is formed according to the prescription $$AC(\tau) = \int_0^T s(t')S_d(t' + \tau)dt' \quad (1A)$$

or $$AC(\tau) = \sum_{k=1}^{K} s(t_k)S_d(t_k + \tau), \quad (1B)$$

depending upon whether integration or summation of sampled values over a suitable contribution time interval is used to compute the composite signal autocorrelation function. The length T of the contribution time interval used to compute the autocorrelation function in Eq. (1A) or (1B) is often chosen to be N times the chip length $\Delta\tau_{chip}$, where N is a large positive number.

Tracking a composite signal requires maintaining signal synchronization. The peak of the autocorrelation function is rounded, not pointed, due to finite bandwidth effects, so that locating a true peak is difficult. Receiver designers have, therefore, resorted to an "early-minus-late" correlation tracking method, as discussed by W. M. Bowles in "Correlation Tracking," Charles Stark Draper Laboratory, May 1980, by Fenton et al in U.S. Pat. No. 5,101,416, and by Lennen in U.S. Pat. Nos. 5,402,450 and 5,493,588. In the early-minus-late tracking method, a first correlator measures an equivalent autocorrelation function when the local replica signal is shifted to an "early" time shift value $\tau=t_E$ relative to the position ($\tau=tp>t_E$) of an ideal or punctual replica, and a second correlator measures a second equivalent autocorrelation function when the local replica signal is shifted to a "late" time $\tau=t_L(>tp)$. By subtracting the late autocorrelation function from the early autocorrelation function, a correlation tracking function or autocorrelation difference function $\Delta AC(\tau)$ with at least one zero-crossing point, corresponding to the autocorrelation function, peak can be developed if the separations of the early and late time shifts from the punctual time shift are chosen to be equal.

If the tracking or time shift variable $\tau$ for the autocorrelation difference function $\Delta AC(\tau)$ lies to the left (to the right) of the zero crossing point, the system uses the presence of positive (negative) values of $\Delta AC(\tau)$ to increase (decrease) the value of $\tau$ and drive the system toward the zero crossing point for $\Delta AC(\tau)$. The zero-crossing point is thus easily measured and tracked, and the equivalent peak value and peak location for the autocorrelation function is easily determined. At the zero-crossing point on this doublet-like tracking function, maximum correlation occurs between the incoming signal and the local replica signal. The zero-crossing point represents the best estimate of time shift $\tau$ for signal synchronization. The internal clock time corresponding to the zero crossing point is a good estimate for time of arrival of an incoming signal at the receiver.

Additive superposition of an equivalent autocorrelation function for the multipath signal (reduced in magnitude and delayed in time) onto the autocorrelation function $AC(\tau)$ for the desired code signal is a useful model for analyzing the effects of presence of multipath signals, as noted in the Fenton et al patent and in the Lennen patents op. cit. Additive superposition of an additional signal onto the desired incoming signal, during the time period when signal correlation occurs, will distort the desired or direct autocorrelation function $AC(\tau;direct)$ and produce an altered autocorrelation function $AC(\tau;composite)$ for the composite signal (direct signal plus multipath signal). Errors in indicated punctual time shift value produce errors in the pseudorange measurements, if these are computed based upon the received signal.

Another useful and equivalent model for analyzing the effects of presence of a multipath signal computes the autocorrelation functions $AC(\tau;x;direct)$ and $AC(\tau;x;multipath)$ (x=E,L) for the pure direct signal and the pure multipath signal, forms the differences $\Delta AC(\tau;direct)$ and $\Delta AC(\tau;multipath)$ and adds these two difference functions to obtain the autocorrelation difference function $\Delta AC(\tau;composite)$ for the composite signal.

Previous work in the area of multipath amelioration has focused on two approaches: 1) estimating the effects and compensating for multipath-induced errors, and 2) attempting to limit the effects of the estimated multipath errors. In the Lennen patents, op. cit., both approaches are described. The estimation methods seek to model the distortions in order to reproduce a measured instantaneous autocorrelation function and to create a correction term to subtract from the indicated punctual time. Estimation methods are worthwhile, but can never obtain perfection, wherein all multipath effects are removed, because the multipath signals are constantly varying and corrections can only be done after the fact.

A multipath error limitation method, such as described in the Lennen patents op. cit., operates in the early-minus-late correlation tracking loop with a shorter delay between the early signal and late signal correlators than previous methods had employed. This limitation method reduces the effects of the presence of multipath substantially.

Several workers have disclosed incorporation of training signals, as an additive feature, to try to compensate for time delays and/or multipath signals at a receiver. Examples of these disclosures are Tilk in U.S. Pat. No. 3,852,534, Close in U.S. Pat. No. 3,869,673, Costas in U.S. Pat. No. 4,349,915, Wilkinson in U.S. Pat. No. 4,543,657, Plangger et al in U.S. Pat. No. 4,582,434, Kobo et al in U.S. Pat. No. 4,896,213, Dieterich et al in U.S. Pat. No. 5,065,242, Koo in U.S. Pat. Nos. 5,047,859, 5,111,298 and 5,121,211, and Chan et al in U.S. Pat. No. 5,127,051, Iga et al in U.S. Pat. No. 5,130,799, Roy et al in U.S. Pat. No. 5,361,102, Kennedy et al in U.S. Pat. No. 5,408,685, and Patel et al in U.S. Pat. No. 5,600,380.

In many of the previous methods for multipath amelioration, samples are taken of the incoming direct (desired) signal component and multipath signal component (s), and a conventional autocorrelation functions and autocorrelation difference functions are formed and analyzed. No attempt is made to uniquely identify the presence of a direct signal within an incoming composite signal, or to extract this unique signal. What is needed is a multipath discrimination approach that allows prompt verification of the presence of, and identification of, a direct signal that was originally transmitted and identification of a multipath component that may also be present in the incoming composite signal.

SUMMARY OF THE INVENTION

These needs are met by the invention, which provides a discrimination technique that allows prompt verification of the presence of, or prompt refutation of the assumed presence of, a direct (line of sight) signal that is transmitted directly from a signal transmitter to the subject signal receiver. An indicium signal is added to, or multiplied into, the direct signal to form a combined signal, and this combined signal is transmitted, for example as a spread spectrum digital signal. This indicium signal preferably includes a higher frequency carrier, or a signal related to the direct signal carrier frequency, that can be separated from the direct signal and analyzed when the combined signal is received by a signal recipient at the other end of a communication channel. The received, separable indicium signal is compared with a stored replica of the indicium signal, acting as a reference signal, and a determination is made of changes that are required to recover the reference signal and its timing, beginning with the received and separated indicium signal. These changes are then applied to the received direct signal, after separation of the received indicium signal therefrom. The result is a processed received signal in which multipath signal contributions are minimized or removed therefrom.

BRIEF DESCRIPTION OF THE DRAWINGS

FIG. 1 illustrates an environment in which the invention can be used.

FIGS. 2–5 are graphical views illustrating addition of an indicium signal to a direct signal to form a combined signal before transmission.

DESCRIPTION OF BEST MODES OF THE INVENTION

Figure 4:
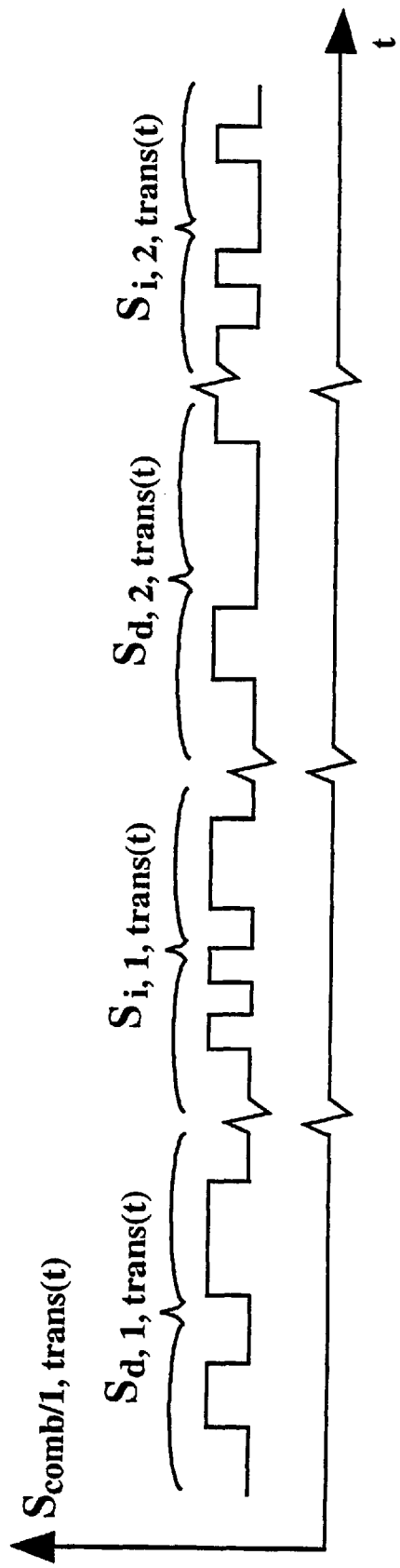

In FIG. 1, a transmission station 11 wishes to transmit a message or signal, called the direct signal, to a receiver station 21 that is spaced apart from the transmission station by a substantial distance, such as a few hundred meters or more, using a wireless transmission channel TC. If only the time-varying direct signal $S_{d,trans}(t)$ is transmitted, the receiver 21 may receive a line-of-sight replica of the direct signal $S_{d,rcv}(t)$ (acted on by the usual distortion and attenuation agents in the channel TC), plus one or more approximate replicas $S_{m,rcv}(t)$ of the multipath signal that are the result of one or more reflections, refractions or other path deviations of the direct transmitted signal $S_{d,trans}(t)$. These approximate replicas $S_{m,rcv}(t)$ are usually received at one or more times after the received direct signal $S_{d,rcv}(t)$ is received and are referred to as multipath signals. Because a multipath signal is not a pure Gaussian or other random noise signal, but is an approximate replica of the original direct signal $S_{d,trans}(t)$, a multipath signal can substantially interfere with, and partially mask the content of, the received direct signal $S_{d,rcv}(t)$.

FIG. 2 illustrates one embodiment of the invention at the transmitter end. An indicium signal $S_{i,trans}(t)$ is added to the transmitted direct signal $S_{d,trans}(t)$ to form a combined transmitted signal, viz.

$$S_{comb/1,trans}(t) = S_{d,trans}(t) \boxplus S_{i,trans}(t) \qquad (2)$$

where the symbol "$\boxplus$" indicates that the transmitted indicium signal Si,trans(t) is additively combined with, or concatenated with the transmitted direct signal $S_{d,trans}(t)$ in some sense, to form a combined transmitted signal that consists of all the unaltered bits of the transmitted direct signal Sd,trans(t) and all the unaltered bits of the indicium signal $S_{i,trans}(t)$. The bit length of the transmitted combined signal $S_{comb/1,trans}(t)$ is thus approximately equal to the sum of the bit lengths of the transmitted direct signal and the transmitted indicium signal. The transmitted combined signal $S_{comb/1,trans}(t)$ may include segments of the transmitted direct signal $S_{d,trans}(t)$ interspersed with segments of the transmitted indicium signal $S_{i,trans}(t)$. Alternatively, the transmitted combined signal $S_{comb/1,trans}(t)$ may include all bits of the transmitted direct signal $S_{d,trans}(t)$ in one segment, followed by all bits of the transmitted indicium signal $S_{i,trans}(t)$ in one segment (FIG. 3), or with the $S_{i,trans}(t)$ bits preceding the $S_{d,trans}(t)$ bits (FIG. 2), where the transmitted direct signal segment and the transmitted indicium signal segment are either contiguous or are separated by a selected separation bit sequence.

The signal that is received at the receiver, designated as $S_{comp/1,rcv}(t)$, as a result of transmission of the transmitted combined signal $S_{comb/1,trans}(t)$ is a received composite signal that may include an approximate replica of $S_{comb1,trans}(t)$ plus one or more received multipath signals $S_{m,rcv}(t)$ plus other random noise signals that are ignored here. With reference to FIG. 2, a time-specific portion of the transmitted combined signal $S_{comb/1,trans}(t)$ given by t1≦t≦t2=t1+Δt(indicium), contains the transmitted indicium signal $S_{i,trans}(t)$, and another time-defined portion, given by t3≦t≦t4=t3+Δt(direct), contains the transmitted direct signal $S_{d,trans}(t)$:

$$S_{comb/1,trans}(t)=S_{i,trans}(t) \; t1 \leq t \leq t2 = S_{d,trans}(t) \; t3 \leq t \leq t4 \quad (3)$$

In one alternative embodiment, shown in FIG. 2, t2≦t3. In a second alternative embodiment, shown in FIG. 3, t4≦t1. In a third alternative embodiment, shown in FIG. 4, two or more portions of the transmitted indicium signal $S_{i,trans}(t)$ and two or more portions of the transmitted direct signal $S_{d,trans}(t)$ are interspersed as shown. The length, t3–t2, of the time interval separating the indicium and direct signals should be unchanged in transmission through any linear medium.

The indicium signal $S_{i,trans}(t)$ preferably includes a recognizable pattern that is either very unlikely to occur or is impossible or illegal in the signal protocol used for transmission of direct signals. For example, if the signal protocol does not allow more than, say, N1 consecutive "ones" to appear in a signal, as in an IEEE 802 protocol, the transmitted indicium signal may consist of a sequence of at least N1+1 consecutive "ones" followed by N0 consecutive "zeroes" (N0≧1) with this sequence being repeated a selected number of times as the transmitted indicium signal $S_{i,trans}(t)$. A direct signal cannot contain such an illegal sequence, and the indicium signal sequence is easily distinguished from any part of a bit pattern that is part of a direct signal.

Figure 5:
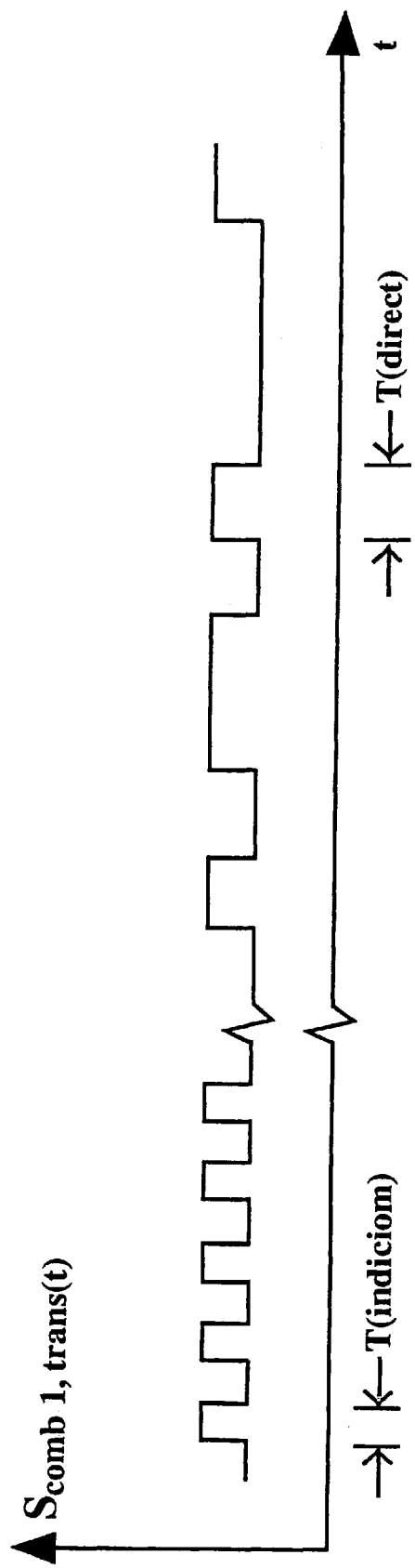

Alternatively, the transmitted indicium signal $S_{i,trans}(t)$ contains or consists of an alternating square wave pattern with a period T(indicium) that is substantially distinct from the bit transition period T(direct) for the transmitted direct signal $S_{d,trans}(t)$, as illustrated in FIG. 5. Here, T(indicium) >>T(direct) or, preferably, T(indicium)<<T(direct). Again, the transmitted indicium signal $S_{i,trans}(t)$ may precede the transmitted direct signal $S_{d,trans}(t)$, as in FIG. 2 and FIG. 5, may follow rather than precede the transmitted direct signal $S_{d,trans}(t)$, as in FIG. 3, or may be interspersed with the transmitted direct signal $S_{d,trans}(t)$, as in FIG. 4.

After the portion (or portions), designated $S_{i,rcv}(t)$, of the received composite signal $S_{comp/1,rcv}(t)$ that contains or corresponds to the transmitted indicium signal. $S_{i,trans}(t)$ are identified, this portion is compared with the reference signal, $S_{ref}(t)=S_{i,trans}(t)$, that was originally transmitted. Certain signal parameters, such as signal propagation time t(arrival;$S_{i,rcv}(t)$)—t(transmission;$S_{i,trans}(t)$) and amplitude attenuation factor χ(indicium)=ampl{$S_{i,rcv}(t)$}/ampl{$S_{i,trans}(t)$}, referred to collectively here as transmission channel parameters, are determined for this identified portion $S_{i,rcv}(t)$, vis-a-vis a reference signal $S_{ref}(t)$. These transmission channel parameters are then applied inversely to determine the time of arrival and amplitude attenuation factor χ(direct) for the received direct signal, and an enhanced version of the received direct signal is constructed. For a linear transmission medium, χ(direct)=χ(indicium).

With reference to identification of parameters of a multipath signal, if any, that is present, it may be preferable to arrange for the transmitted indicium signal $S_{i,trans}(t)$ to be separated from (or non-contiguous to) the transmitted direct signal $S_{d,trans}(t)$ by a first short period of relative silence in the transmitted bit sequence and to be separated from any other preceding or following transmitted direct signal by a second short period of relative silence. This arrangement allows any received multipath signal $S_{m,rcv}(t)$ that is associated only with the transmitted indicium signal $S_{i,trans}(t)$ to be unambiguously identified and analyzed. For example, this received multipath signal associated with the transmitted indicium signal $S_{i,trans}(t)$ might be characterized in the form $$S_{m,rcv}(t)=\chi S_{i,trans}(t-b) \quad (4)$$

where χ is an amplitude attenuation factor (−1≦χ≦1) and b is a multipath signal time delay (b>0) associated with this multipath signal. The parameters χ and b for a multipath signal that arises from or is associated with a received indicium signal $S_{i,rcv}(t)$ can be identified using a technique discussed later.

Figure 6:
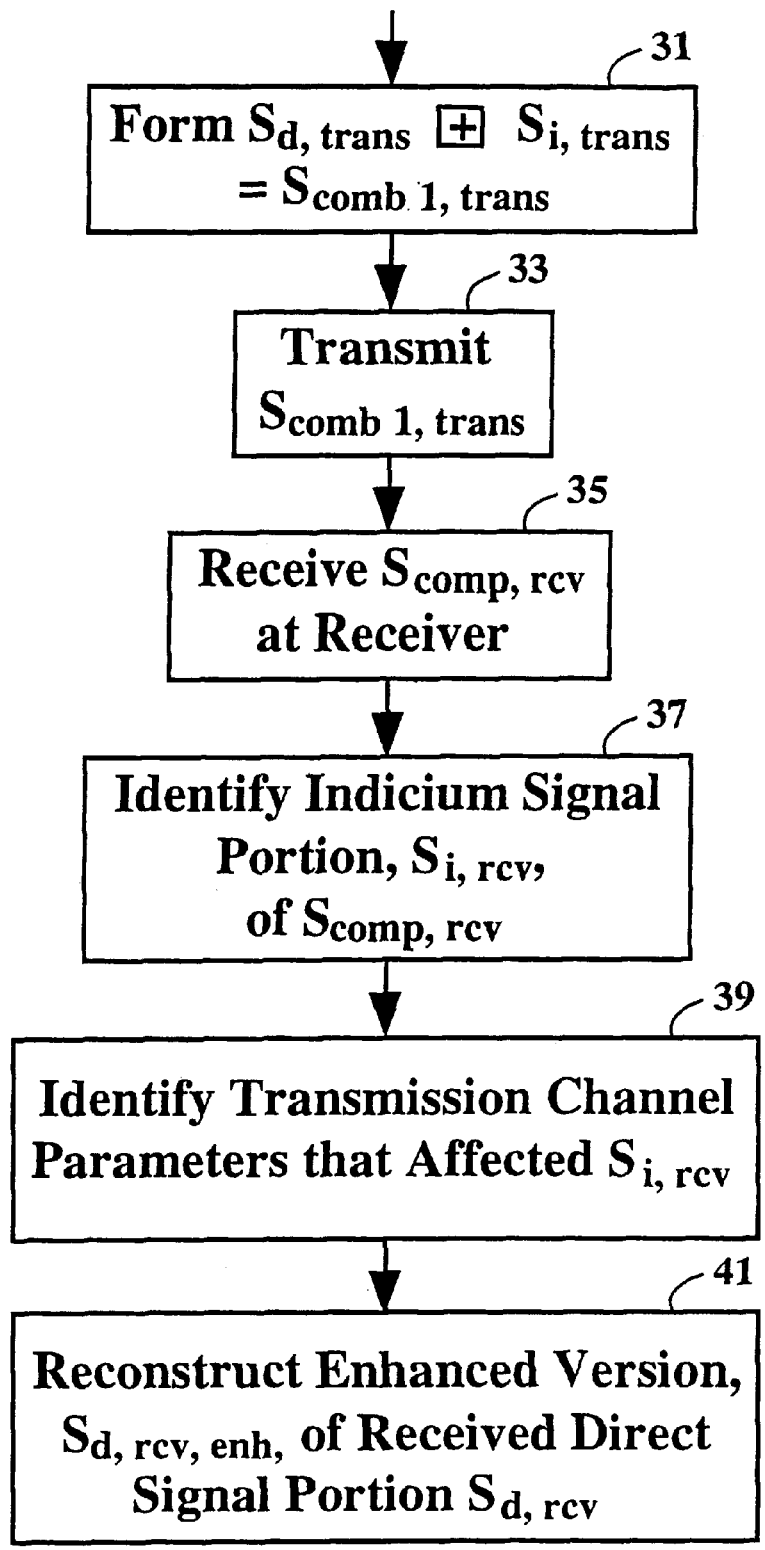
FIG. 6 is a flow chart illustrating processing of the transmitted combined signal shown in FIGS. 2–5 according to the invention.

This procedure is illustrated in a flow chart in FIG. 6. In step 31, a selected indicium signal $S_{i,trans}(t)$ is combined additively with a direct signal $S_{d,trans}(t)$ to be transmitted, to form a combined transmitted signal $S_{comb/1,trans}(t)$. In step 33, this combined transmitted signal is transmitted. In step 35, a composite signal Scomp/1,rev(t) that is the result of transmitting the transmitted combined signal Scomb/l,trans (t) is received. In step 37, the portion (or portions) of the received composite signal $S_{comp/1,rcv}(t)$ that contain or correspond to the transmitted indicium signal $S_{i,trans}(t)$ are identified. In step 39, the transmission channel parameters for the received indicium signal $S_{i,rcv}(t)$ are identified. In step 41, the identified transmission channel parameters are used to reconstruct an enhanced version, $S_{d,rcv,enh}(t)$, of the received direct signal $S_{d,rcv}(t)$ and/or to identify any multipath signal(s) that is present in the signal transmission at this time. A transmitted indicium signal $S_{i,trans}(t)$ should be included as part of a transmitted combined signal from time to time (e.g., once every 1–60 sec) in order to evaluate the time varying characteristics of the transmission channel, such as development of multipath signals with changing multipath time delays and changing attenuation factors.

Figure 7A:
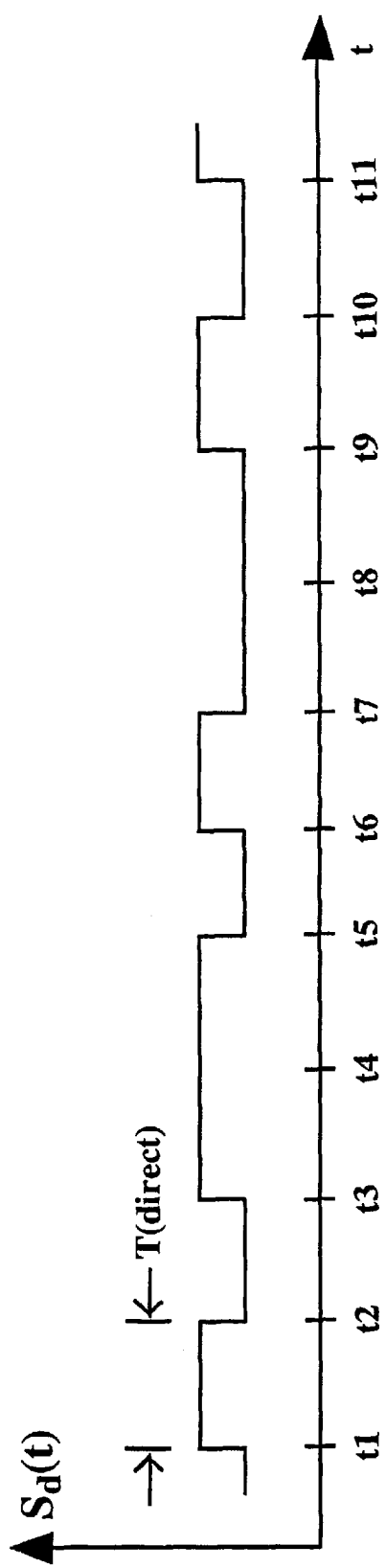
FIGS. 7A–7I are graphical views illustrating multiplicative combination of an indicium signal with a direct signal before transmission.
Figure 7B:
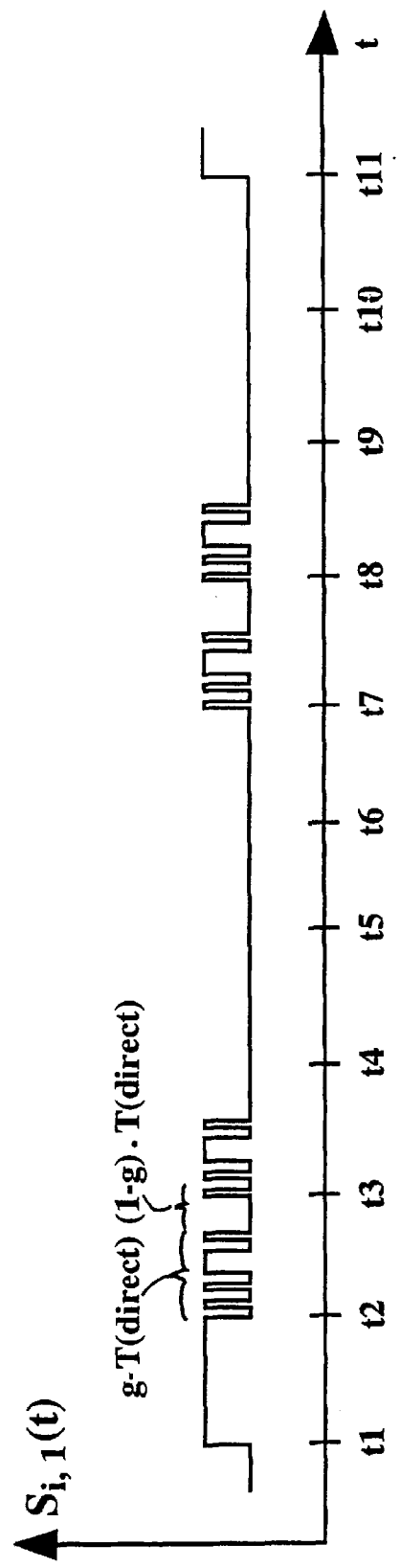
Figure 7C:
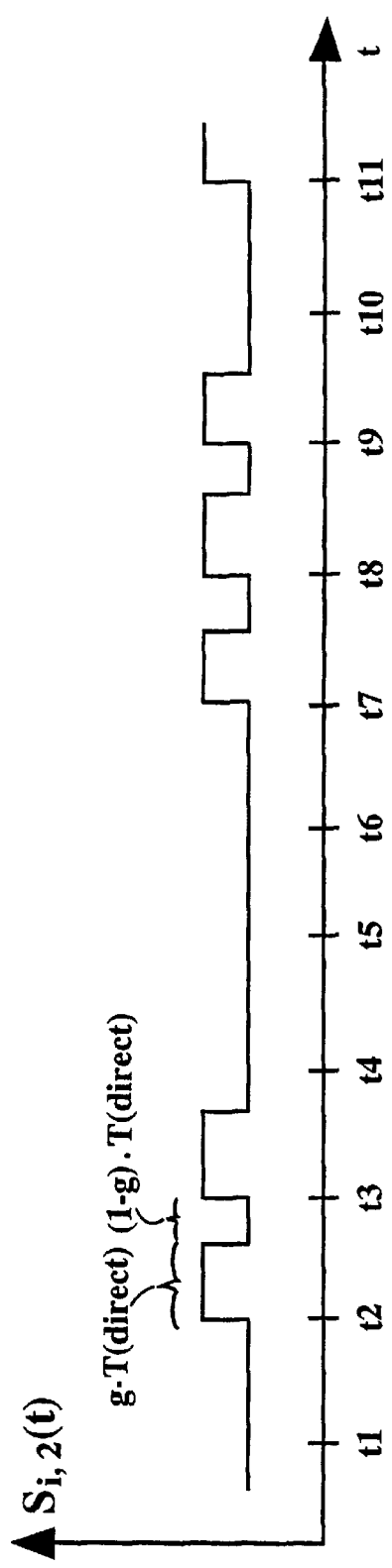

The preceding analysis uses additive combination of an indicium signal with a direct signal and thus requires transmission of a signal of greater length than the original direct signal. Another approach to discrimination of a multipath signal that may be present in the receive signal uses what may be characterized as "multiplicative" combination of an indicium signal with a direct signal. FIGS. 7A–7I illustrate one such approach. FIG. 7A shows an original direct signal $S_{d,trans}(t)$ to be transmitted, and FIGS. 7B and 7C show two suitable time variations of a selected indicium signal $S_{i,trans}(t)$ that is combined with and transmitted with the direct signal, using a Boolean operation (^) such as addition, addition-and-complementation, multiplication, multiplication-and-complementation, EXclusive OR or EXclusive NOR, to produce a combined transmitted signal $S_{comb/2,trans}(t)$ that is transmitted for receipt by a receiver that is spaced apart from the transmitter as in FIG. 1. The transmitted indicium signal $S_{i,trans}(t)$ contains a distinguishable pattern of zeroes and ones with a bit transition period T(indicium) that is a selected small fraction f, preferably in the range 0<f<<1, of the bit transition period T(direct) for the transmitted direct signal $S_{d,trans}(t)$. For purposes of illustration here, f=0.5 and f=0.1 are selected for FIGS. 7B and 7C, respectively. However, any other fraction of will serve as well here.

FIGS. 7D–7I illustrate the result of application of a Boolean operation, written generically as $S_{d,trans}(t) \char`\^ S_{i,trans}(t)$, to the signals $S_{d,trans}(t)$ and $S_{i,trans}(t)$, using the transmitted indicium signal $S_{i,trans}(t)$ shown in FIG. 7C. A similar signal $S_{d,trans}(t) \char`\^ S_{i,trans}(t)$ can be generated using the transmitted indicium signal $S_{i,trans}(t)$ shown in FIG. 7B. Each bit time interval, referred to as a "chip" here, of the transmitted direct signal $S_{d,trans}(t)$ has a length T(direct). Each corresponding chip in the Boolean sum $S_{d,trans}(t) \char`\^ S_{i,trans}(t)$ has a first segment and a second segment, where the first segment has a signal value equal to the signal value of the transmitted direct signal $S_{d,trans}(t)$ for that chip and the second segment has a signal value that depends upon (1) the signal values $S_{d,trans}(t)$ and $S_{i,trans}(t)$ for that chip and (2) the particular Boolean operation ^applied for that chip. Alternatively, the signal value $S_{d,trans}(t) \char`\^ S_{i,trans}(t)$ can be formed in the first segment of each chip and the signal value $S_{d,trans}(t)$ can be formed in the second segment of each chip.

Figure 7D:
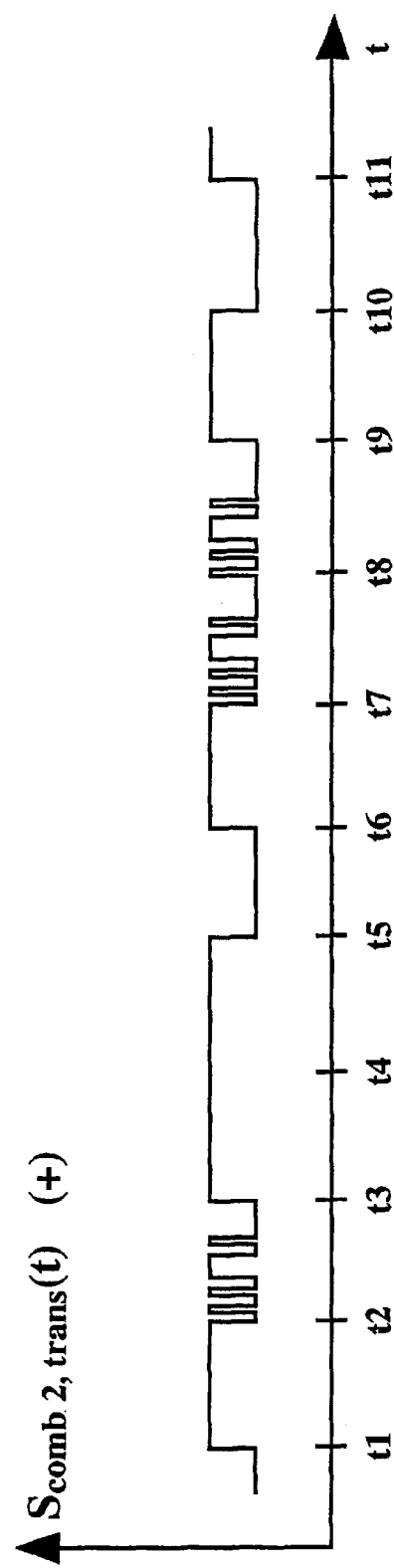

FIG. 7D illustrates the result of forming a Boolean sum combination (^replaced by Boolean addition ⊕) to the signals $S_{d,trans}(t)$ and $S_{i,trans}(t)$. During the first segment of each chip, the signal value is constant and is equal to the direct signal value $S_{d,trans}(t)$ for that chip. During the second segment of each chip, the signal value is $S_{d,trans}(t) \oplus S_{i,trans}(t)$ and thus oscillates or varies according to the following relations:

$$S_{d,trans}(t)=0: S_{d,trans}(t) \oplus S_{i,trans}(t)=S_{i,trans}(t) \quad (5D)$$

$$S_{d,trans}(t)=1: S_{d,trans}(t) \oplus S_{i,trans}(t)=1 \quad (6D)$$

Figure 7E:
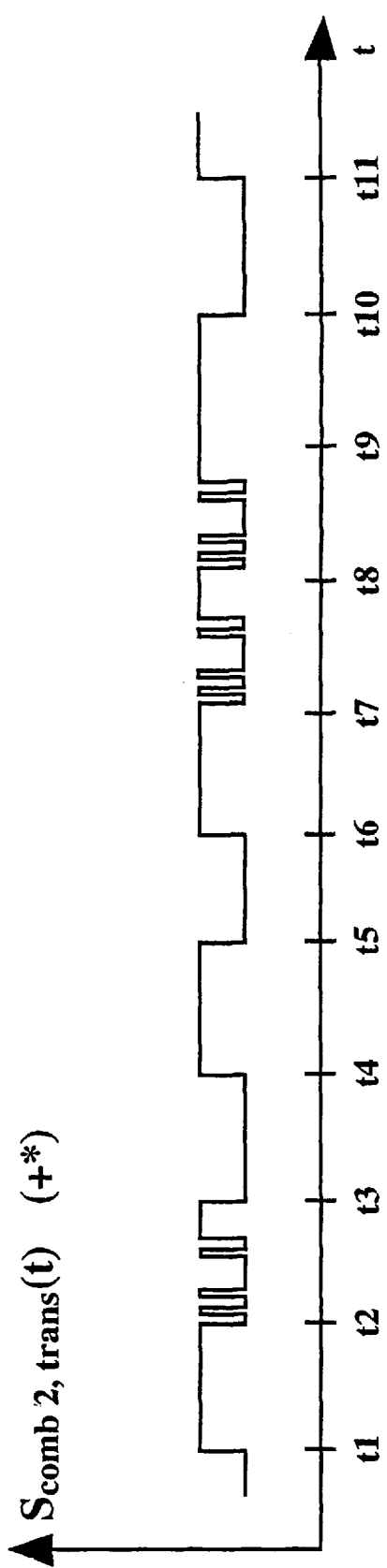

FIG. 7E illustrates the result of forming a Boolean combination that is the Boolean complement of a Boolean sum: $S_{d,trans}(t) \char`\^ S_{i,trans}(t) = (S_{d,trans}(t) \oplus S_{i,trans}(t)) \oplus S_{d,trans}(t))^* = S_{i,trans}(t)^*$. During the first segment of each chip, the signal value is constant and is equal to the direct signal value $S_{d,trans}(t)$ for that chip. During the second segment of each chip, the signal value is $(S_{d,trans}(t) \oplus S_{i,trans}(t))^*$ and thus oscillates or varies according to the following relations:

$$S_{d,trans}(t)=0: (S_{d,trans}(t) \oplus S_{i,trans}(t))^*=1 \quad (5E)$$

$$S_{d,trans}(t)=1:(S_{d,trans}(t) \oplus S_{i,trans}(t))^*=S_{i,trans}(t) \quad (6E)$$

Figure 7F:
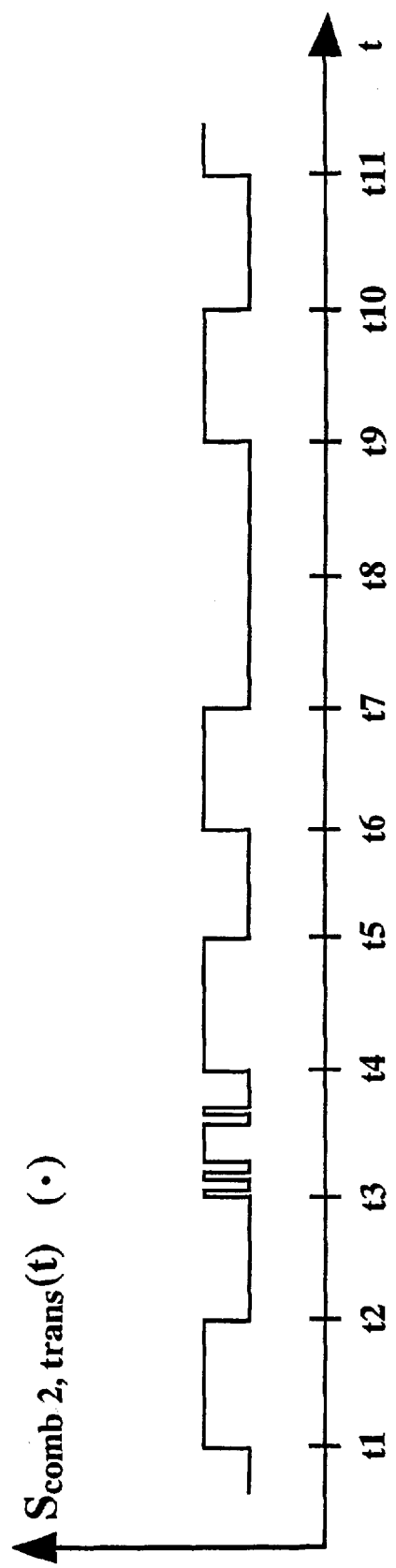

FIG. 7F illustrates the result of forming a Boolean product combination ^ replaced by Boolean multiplication ⊗) to the signals $S_{d,trans}(t)$ and $S_{i,trans}(t)$. During the first segment of each chip, the signal value is constant and is equal to the direct signal value $S_{d,trans}(t)$ for that chip. During the second segment of each chip, the signal value is $S_{d,trans}(t) \otimes S_{i,trans}(t)$ and thus oscillates or varies according to the following relations:

$$S_{d,trans}(t)=0: S_{d,trans}(t) \otimes S_{i,trans}(t)=0 \quad (5F)$$

$$S_{d,trans}(t)=1: S_{d,trans}(t) \otimes S_{i,trans}(t)=S_{i,trans}(t) \quad (6F)$$

Figures 7G, 7H:
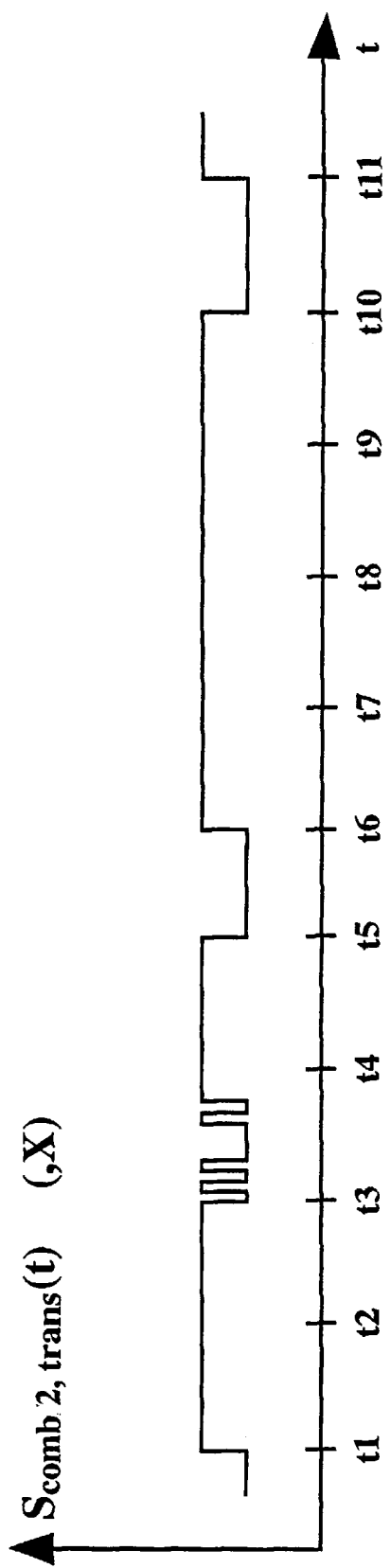

FIG. 7G illustrates the result of forming a Boolean combination that is a Boolean complement of a Boolean product of the signals $S_{d,trans}(t)$ and $S_{i,trans}(t)$. During the first segment of each chip, the signal value is constant and is equal to the direct signal value $S_{d,trans}(t)$ for that chip. During the second segment of each chip, the signal value is $(S_{d,trans}(t) \otimes S_{i,trans}(t))^*$ and thus oscillates or varies according to the following relations:

$$S_{d,trans}(t)=0: (S_{d,trans}(t) \boxplus S_{i,trans}(t))^*=1 \quad (5G)$$

$$S_{d,trans}(t)=1:(S_{d,trans}(t)^* = S_{i,trans}(t))^* = S_{i,trans}(t) \quad (6G)$$

FIG. 7H illustrates the result of forming a Boolean combination that is the EXclusive OR (^=XOR) of the signals $S_{d,trans}(t)$ and $S_{i,trans}(t)$. During the first segment of each chip, the signal value is constant and is equal to the direct signal value $S_{d,trans}(t)$ for that chip. During the second segment of each chip, the signal value is $S_{d,trans}(t)$ XOR $S_{i,trans}(t)=S_{d,trans}(t) \cdot S_{i,trans}(t)^* + S_{d,trans}(t)^* \cdot S_{i,trans}(t)$ and thus oscillates or varies according to the following relations:

$$S_{d,trans}(t)=S_{d,trans}(t) \text{ XOR } S_{i,trans}(t)=S_{i,trans}(t), \quad (5H)$$

$$S_{d,trans}(t)=1: S_{d,trans}(t) \text{ XOR } S_{i,trans}(t)=S_{i,trans}(t)^* \quad (6H)$$

Figure 7I:
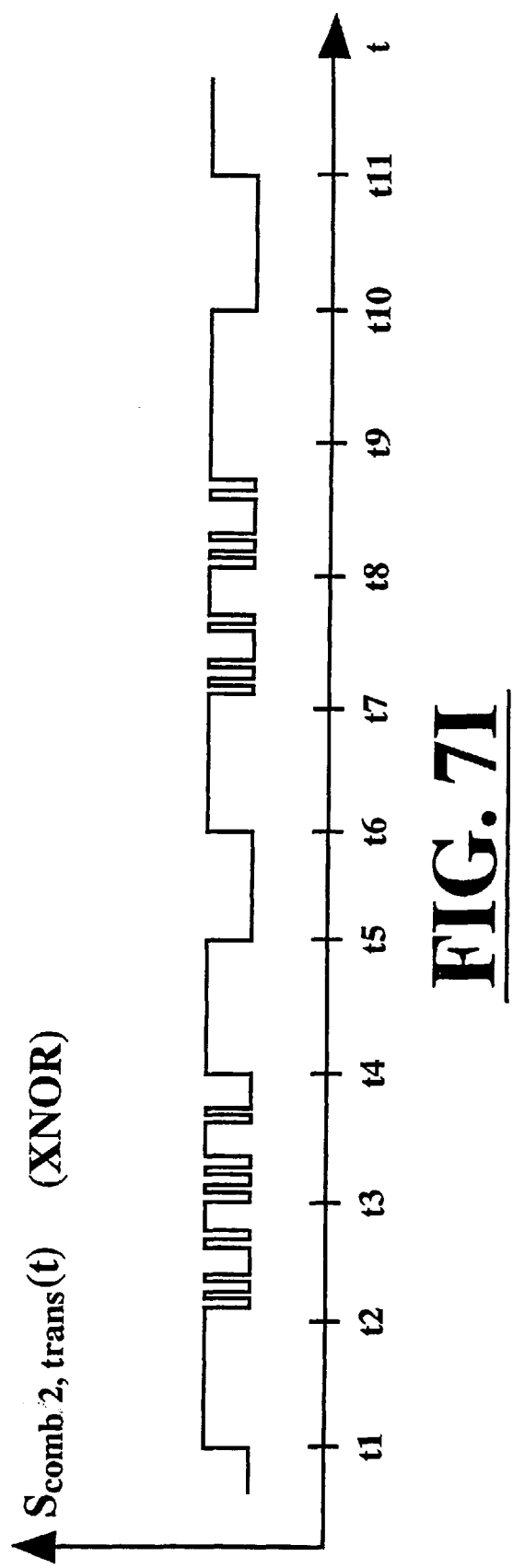

FIG. 7I illustrates the result of forming a Boolean combination that is the EXclusive NOR combination (^=XNOR) of the signals $S_{d,trans}(t)$ and $S_{i,trans}(t)$, which involves complementation of $S_{d,trans}(t)$ XOR $S_{i,trans}(t)$. During the first segment of each chip, the signal value is constant and is equal to the direct signal value $S_{d,trans}(t)$ for that chip. During the second segment of each chip, the signal value is $S_{d,trans}(t)$ XNOR $S_{i,trans}(t)$ and thus oscillates or varies according to the following relations:

$$S_{d,trans}(t)=0: S_{d,trans}(t) \text{ XNOR } S_{i,trans}(t)=S_{i,trans}(t)^* \quad (5I)$$

$$S_{d,trans}(t)=1: S_{d,trans}(t) \text{ XNOR } S_{i,trans}(t)=S_{i,trans}(t) \quad (6I)$$

Other Boolean logical operations can also be applied to combine the signals $S_{d,trans}$ and $S_{i,trans}$, but the examples in FIGS. 7D–7I suffice to illustrate the kind of operations involved. The Boolean combinations discussed above can be applied instead to the transmitted indicium signal $S_{i,trans}(t)$ and an independently chosen (constant) bit value (0 or 1), and the value of this Boolean combination can be imposed on a selected portion of a direct signal bit value having a temporal length at least equal to the temporal length of the signal $S_{i,trans}(t)$.

For the time interval of each chip, given by $t_n \leq t < t_{n+1} = t_n + \Delta t_{chip}$, for the direct signal $S_{d,trans}(t)$, the combined signal $S_{comb/2,trans}(t)$ that is transmitted is defined by:

$$S_{comb/2,trans}(t)=S_{d,trans}(t) \ (t_n \leq t \leq t_n + g \cdot \Delta t_{chip})=S_{d,trans}(t) \char`\^ S_{i,trans}(t)$$
$$(t_n + g \cdot \Delta t_{chip} \leq t \leq t_{n+1}) \quad (7)$$

for each "active" chip for which the combined signal $S_{d,trans}(t) \char`\^ S_{i,trans}(t)$ is used. The combined signal $S_{d,trans}(t) \char`\^ S_{i,trans}$ (t) need not be formed and used for every chip; this combined signal may be formed and used for one or more consecutive active chips from time to time (e.g., once every 1–60 sec), with each "non-active" chip in the remainder of the chips containing only the unaltered direct signal value $S_{d,trans}(t)$ for that chip. The choice of the indicium signal $S_{i,trans}(t)$ used for each active chip can be varied. For example, one active chip or group of consecutive active chips can use the indicium signal $S_{i,trans}(t)$ shown in FIG. 7B and another active chip or group of consecutive active chips can use the indicium signal $S_{i,trans}(t)$ shown in FIG. 7C.

After the composite signal $S_{comp,rcv}(t)$ is received by the receiver and the timing for the received signal is established, the (first) segment of each chip that contains the unaltered direct signal portion for that chip is read and stored in an ordered sequence. The (second) segment that contains the received signal corresponding to $S_{d,trans}(t)\char`\^ S_{i,trans}(t)$ for each chip is read, and the result of transmission of the indicium signal, namely $S_{i,rcv}(t)$ for that chip is determined. The receiver signal $S_{i,rcv}(t)$ is analyzed to determine the effect of the transmission channel TC on the combined signal $S_{d,trans}(t)\char`\^ S_{i,trans}(t)$, in a manner analogous to the method used for the additive approach illustrated in FIGS. 2–6.

Figure 8:
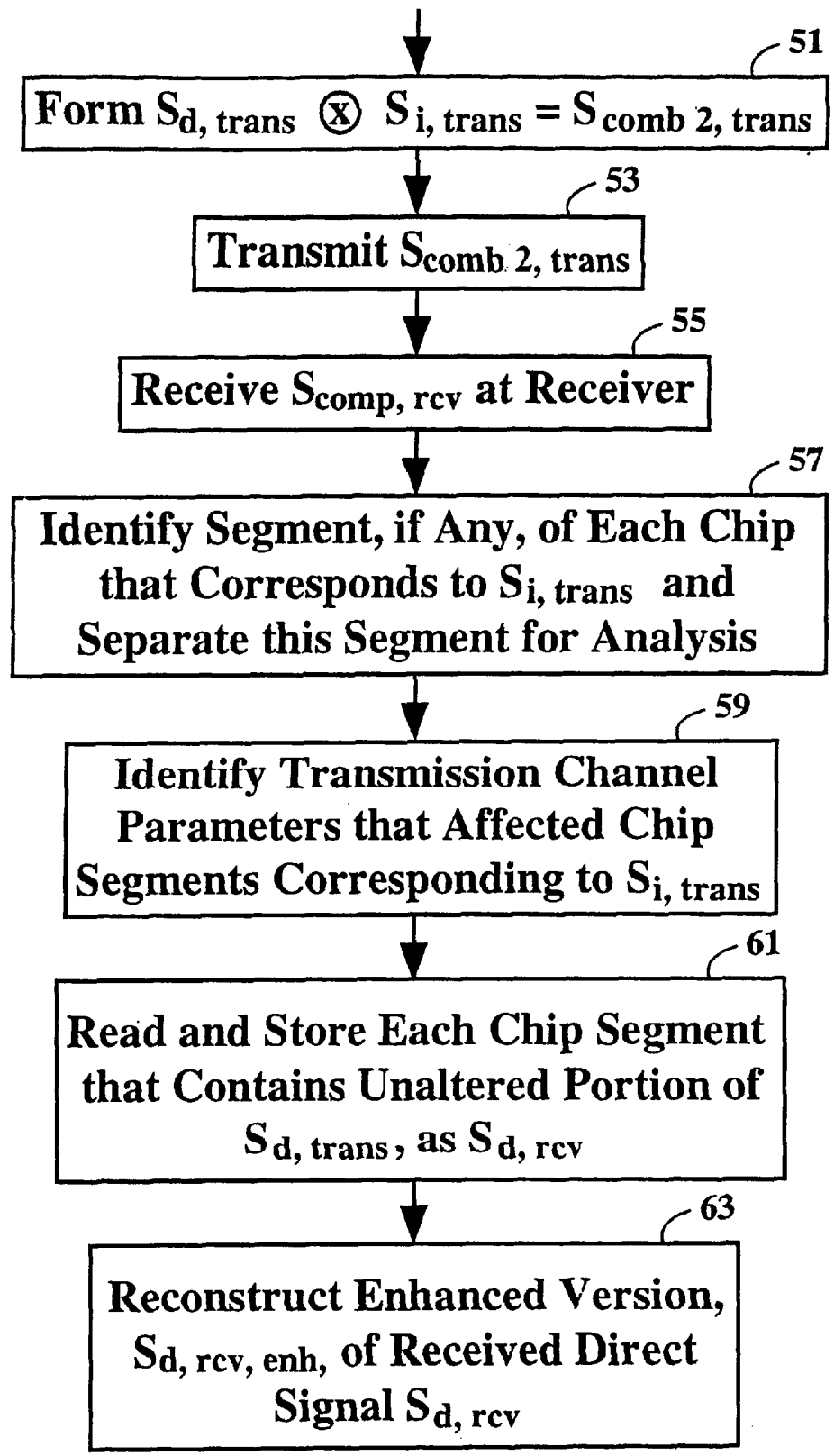
FIG. 8 is a flow chart illustrating processing of the transmitted combined signal shown in FIGS. 7A–7I according to the invention.

This "multiplicative" procedure is illustrated in a flow chart in FIG. 8. In step 51, a selected indicium signal $S_{i,trans}(t)$ is "multiplicatively" combined, as discussed in the preceding, with a direct signal $S_{d,trans}(t)$ to be transmitted, to form a combined transmitted signal $S_{comb/2,trans}(t)$. In step 53, this combined transmitted signal is transmitted. In step 55, a composite signal $S_{comp/2,rcv}(t)$ that is the result of transmitting the transmitted combined signal $S_{comb/2,trans}(t)$ is received. In step 57, the segment of each chip of the received composite signal $S_{comb/2,rcv}(t)$ that contains or corresponds to the reference signal $S_{i,trans}(t)$ is read and analyzed. In step 59, the transmission channel parameters for the received indicium signal $S_{i,rcv}(t)$ are identified. In step 61, the segment of each chip that, as transmitted, included an unaltered direct signal value $S_{d,trans}(t)$ for that chip is read and optionally stored as $S_{d,rcv}(t)$. In step 63, the identified transmission channel parameters are used to reconstruct an enhanced version, $S_{d,rcv,enh}(t)$ of the received direct signal $S_{d,rcv}(t)$ and/or to identify any multipath signal (s) that is present in the signal transmission at this time. One or more consecutive active chips, with corresponding indicium signal $S_{i,trans}(t)$, should be included as part of a transmitted combined signal from time to time (e.g., once every 1–60 sec) in order to evaluate the time varying characteristics of the transmission channel, such as development of fnultipath signals with changing multipath time delays and changing attenuation factors.

Figure 9:
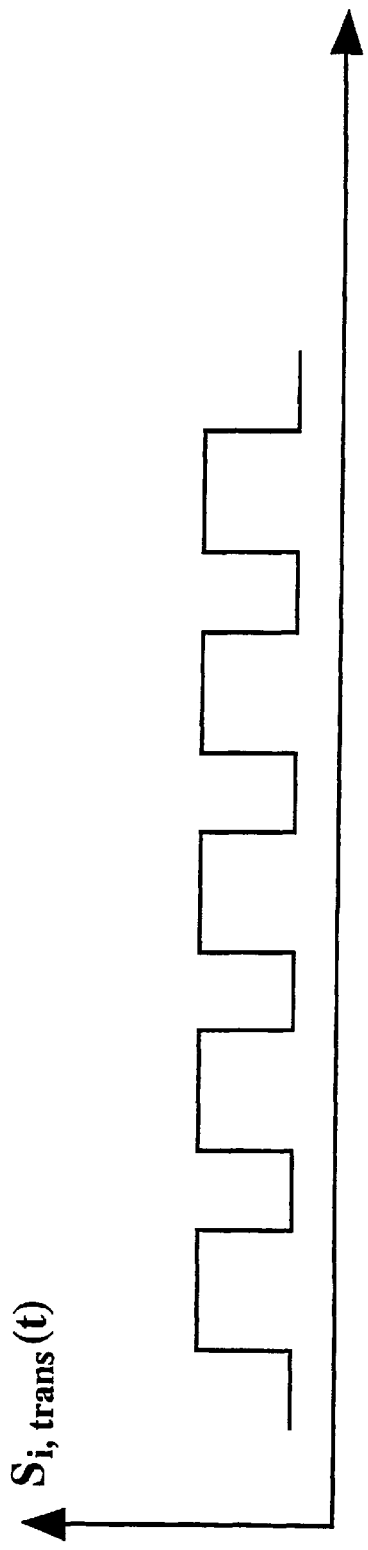
FIGS. 9, 10, 11 and 12 are graphical views of indicium signals used in inverting some effects of signal propagation on the received signals.

One method of recovery of the transmitted direct signal uses a rapidly alternating square wave, shown in FIG. 9, for the transmitted indicium signal $S_{i,trans}(t)$. Preferably, the period T(indicium) for this square wave is chosen to be much smaller than the minimum period T(direct) of the direct signal, consistent with available bandwidth for processing the received indicium signal. A reference signal $S_{ref}(t)$, which is a replica of the transmitted indicium signal $S_{i,trans}(t)$, is stored at the receiver, and a correlation function $$C(\tau)=\int_0^T S_{compo,rcv}(t')\char`\^ S_{ref}(t'+\tau)dt' \qquad (8)$$

is formed using the reference signal and the received composite signal, where τ is a time shift variable and the indicated Boolean operation "^" is preferably either XOR or XNOR. It is assumed that the transmitted direct signal portion is constant (e.g., 0 or 1) during the time interval for variation of the transmitted indicium signal portion.

Figure 10:
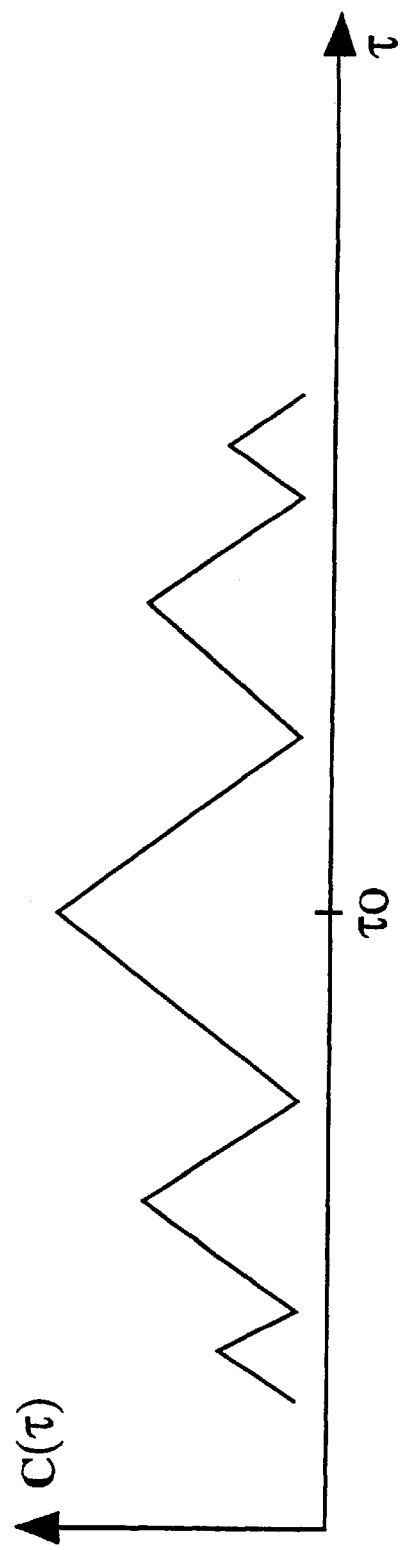

As the time shift variable X is varied across the as-yet-unknown time delay for propagation and receipt of the composite signal, the correlation function C(τ) will appear approximately as illustrated in FIG. 10, with the value of the time shift variable, τ=τ=τ(i), for the peak value C'0 with the largest magnitude for the correlation function corresponding to the time of arrival of the received indicium signal $S_{i,rcv}(t)$ at the receiver. The value C'0 may be positive or negative, but is most likely to be positive.

If Δt(d/i) is the time difference between transmission of the first wave front of the direct signal and transmission of the first wave front of the indicium signal, this time difference should be preserved for transmission through a linear medium. Thus, the time of arrival of the direct signal at the receiver should correspond to the time shift value $$\tau(d)=\tau(i)+\Delta t(d/i) \qquad (9)$$

Now form the ratio of the value C'0 divided by the (positive) peak value C0 for the largest magnitude of the autoorrelation function $$C_0(\tau)=\int_0^T S_{i,trans}(t')\char`\^ S_{i,trans}(t'+\tau)\,dt \qquad (10)$$

This ratio is approximately equal to the ratio of the amplitude of the received indicium signal $S_{i,rcv}(t)$ divided by the amplitude of the transmitted indicium signal $S_{i,trans}(t)$; that is, $$C'0/C0=amp1\{S_{i,rcv}(t)\}/amp1\{S_{i,trans}(t)\}=\chi(i) \qquad (11)$$

A modified received composite signal, defined by $$S_{comp,rcv,mod}(t)=S_{comp,rcv}(t)-\chi(i)S_{i,trans}(t-\tau(i)) \qquad (12)$$

is formed, which removes the first image of the indicium signal received at the receiver.

A modified correlation signal $$C_{mod}(\tau)=\int_0^T S_{comp,rcv,mod}(t')\char`\^ S_{ref}(t'+\tau)dt' \qquad (13)$$

is now formed. If the modified correlation function $C_{mod}(\tau)$ manifests a time shift variation that resembles that shown in FIG. 9, this indicates that at least one multipath indicium signal is present in the received composite signal. The analysis associated with Eqs. (8)–(12) can be repeated to determine the time of arrival τ(i;m) and associated amplitude χ(i;m) of this multipath indicium signal. A multipath direct signal should arrive at the signal at a time corresponding to the time shift value $$\tau(d;m))=\tau(i;m)+\Delta t(d/i) \qquad (14)$$

If the shape of the transmitted direct signal $S_{d,trans}(t)$ is known, one can form an enhanced received composite signal, defined by $$S_{comp,rcv,enh}(t)=S_{comp,rcv}(t)-\chi(i)\,S_{i,trans}(t-\tau(i))-\chi(i:m)\,S_{i,trans}(t-\tau(i;m))-\chi(d;m)\,S_{d,trans}(t-\tau(d;m)) \qquad (15)$$

If the direct signal shape is not known, terms such as τ(d;m) $S_{d,trans}(t-\tau(d;m))$ would not be removed from the received composite signal in Eq. (15). This enhanced received composite signal should better represent the received direct signal $S_{d,rcv}(t)$, with the indicium signal and the most significant multipath signals removed. The analysis in Eqs. (13)–(15) can be repeated to produce a new enhanced received composite signal with additional multipath indicium signals and, optionally, multipath direct signals removed.

Figure 11:
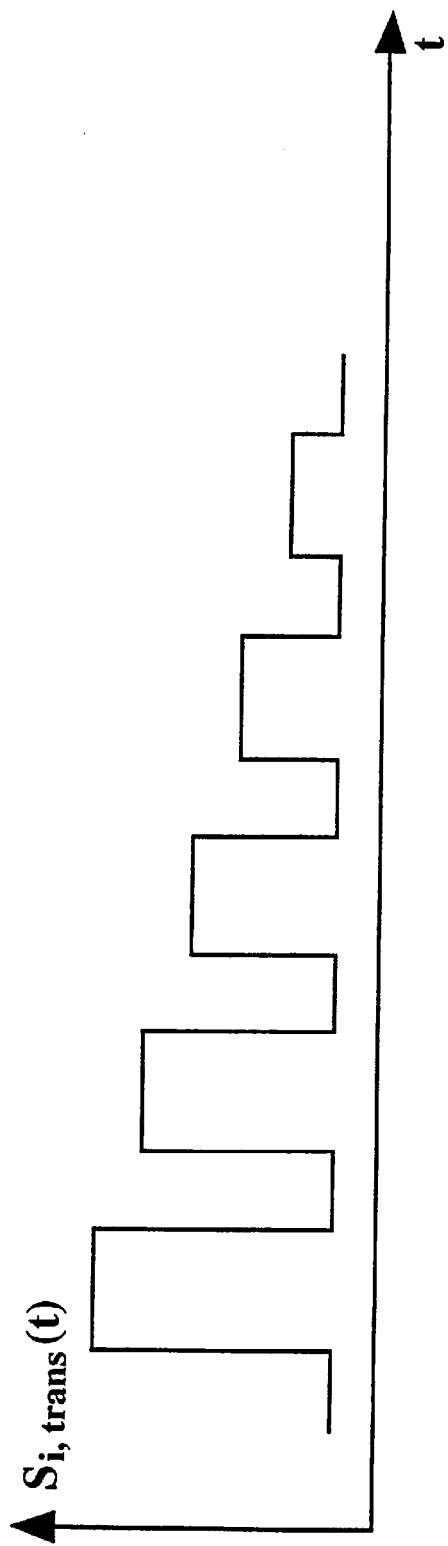
Figure 12:
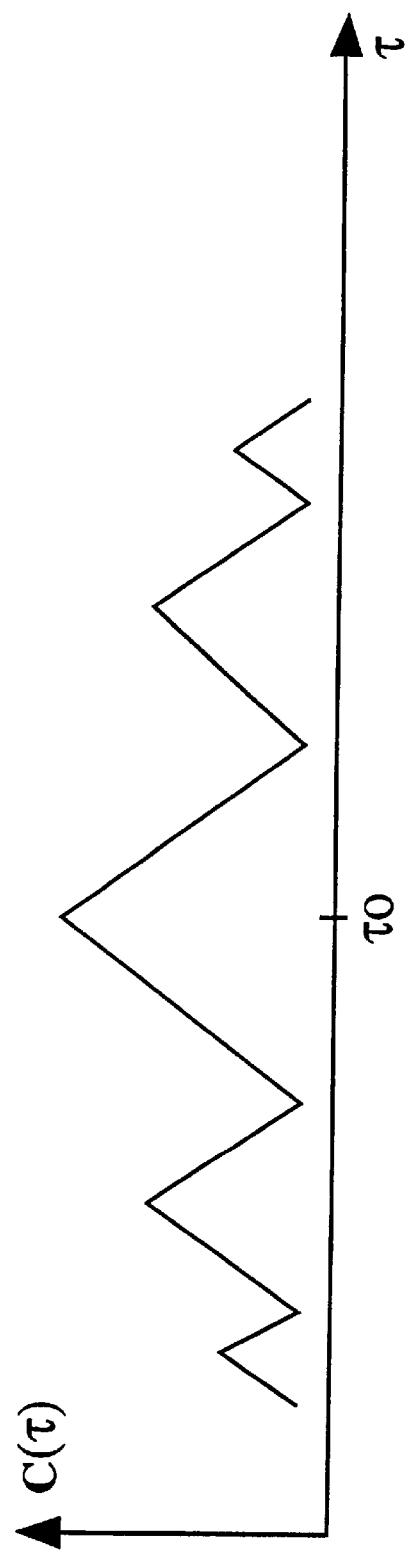

It is not necessary to use the particular indicium signal shown in FIG. 9. Any reasonable shape for the transmitted indicium signal $S_{i,trans}(t)$ may be used. For example, if the transmitted indicium signal shown in FIG. 11 is used, the correlation signal $C(\tau)$, computed as in Eq. (8), will appear approximately as in FIG. 12 for the received indicium signal portion. Here, the correlation function central peak value is especially large relative to the values of the adjacent peaks.

Figure 13:
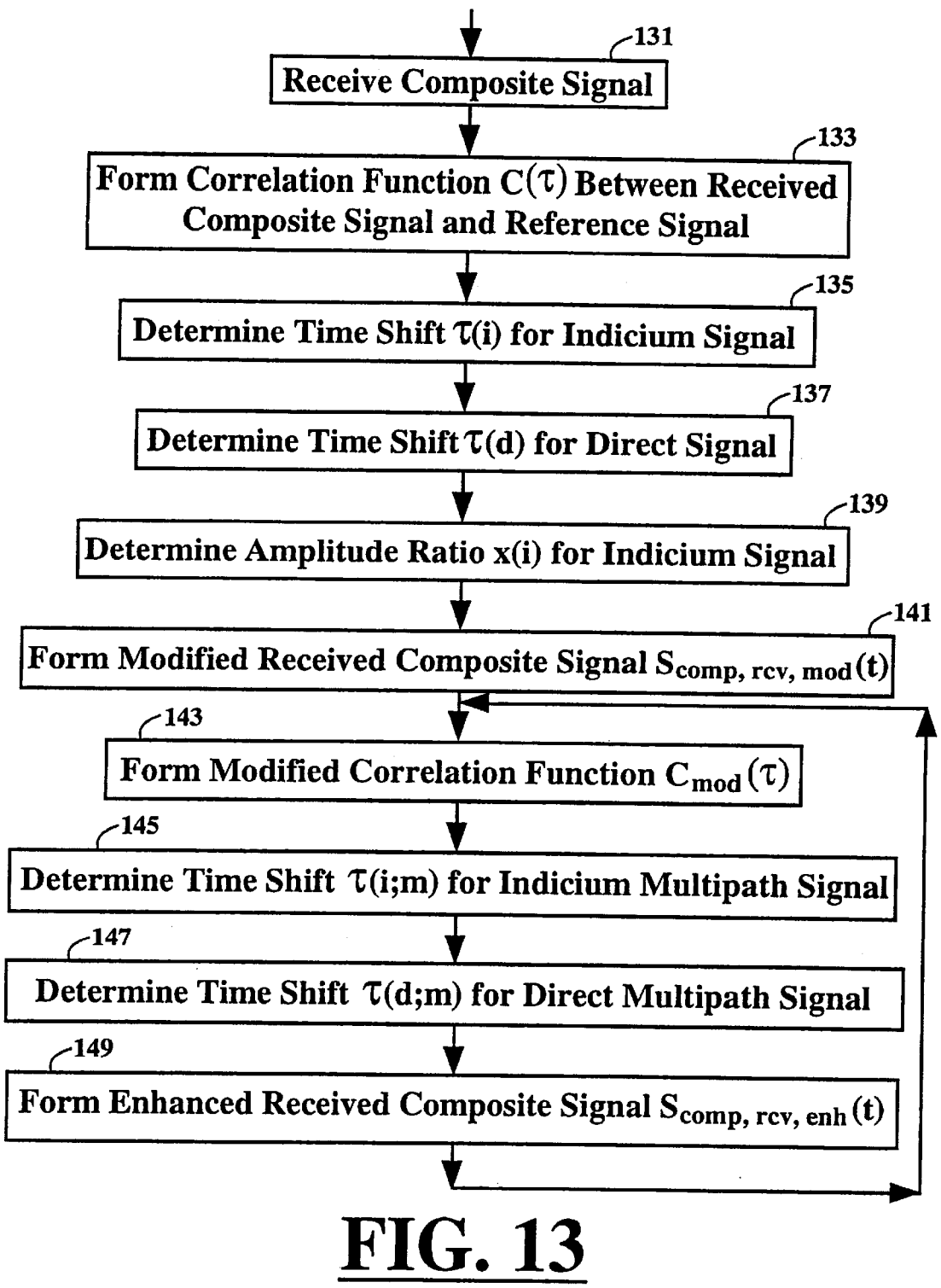
FIG. 13 is a flow chart illustrating a procedure for determining and inverting the effects of propagation on a received composite signal.

FIG. 13 is a flow chart illustrating an embodiment of a procedure for determining and inverting the effects of signal propagation on the composite signal. In step 131, the composite signal $S_{comp,rcv}(t)$ is received at a receiver. In step 133, a correlation function $C(\tau)$ is formed between the received composite signal and a reference signal, which is preferably a replica of the transmitted indicium signal $S_{i,trans}(t)$. In step 135, a time shift value $\tau(i)$ that produces a maximum value for the correlation function $C(\tau)$ is determined. In step 137, the time of arrival of the direct signal at the receiver, $\tau(d)=\tau(i)+\Delta t(d/i)$, is estimated, using the known separation time $\Delta t(d/i)$ transmission of the direct signal and transmission of the indicium signal. In step 139, the ratio $\chi(i)$ of the received indicium signal amplitude divided by the transmitted indicium signal amplitude is estimated. In step 141, a modified received composite signal $S_{comp,rcv,mod}(t)$ is formed, for example, by a relation such as Eq. (12), that removes a first effect of receipt of the transmitted indicium signal from the received composite signal.

In step 143, a modified correlation function $C_{mod}(\tau)$ is formed between the modified received composite signal and the reference signal. In step 145, a time shift value $\tau(i;m)$ that produces a maximum value for the modified correlation function $C_{mod}(\tau)$ is determined. The time shift $\tau(i;m)$ corresponds to arrival at the receiver of a (first) multipath signal arising from the indicium signal. In step 147, the time of arrival at the receiver of the (first) multipath signal arising from the direct signal, $\tau(d;m)=\tau(i;m)+\Delta t(d/i)$, and a multipath attenuation factor $\chi(i;m)$ and/or $\chi(d;m)$ are estimated. In step 149, an enhanced received composite signal $S_{comp,rcv,enh}(t)$ is formed, for example, as in Eq. (15), by removing the estimated effects of the indicium signal, the (first) multipath signal arising from the indicium signal, and the (first) multipath signal arising from the direct signal, from the received composite signal. The steps 143–149 can be repeated to further enhance appearance of the direct signal.

The steps 133–149 can be performed in (near) real time (i.e.; within a few seconds after receipt of the received composite signal) by (1) introducing a time delay in receipt of the received composite signal, (2) time shifts $\tau(i)$, $\tau(d)$, $\tau(i;m)$ and $\tau(d;m)$ and attenuation factors $\chi(i)$, $\chi(i;m)$ and/or $\chi(d;m)$ are estimated during this time delay interval, and (3) an enhanced received composite signal $S_{comp,rcv,enh}(t)$ is constructed after the received composite signal $S_{comp}(t)$ issues from the time delay line. Alternatively, the incoming composite signal values can be sampled and saved, and the analysis in steps 133–149 can be performed in a post-processing environment, where use of a lengthy time delay is probably not required.

Figure 14:
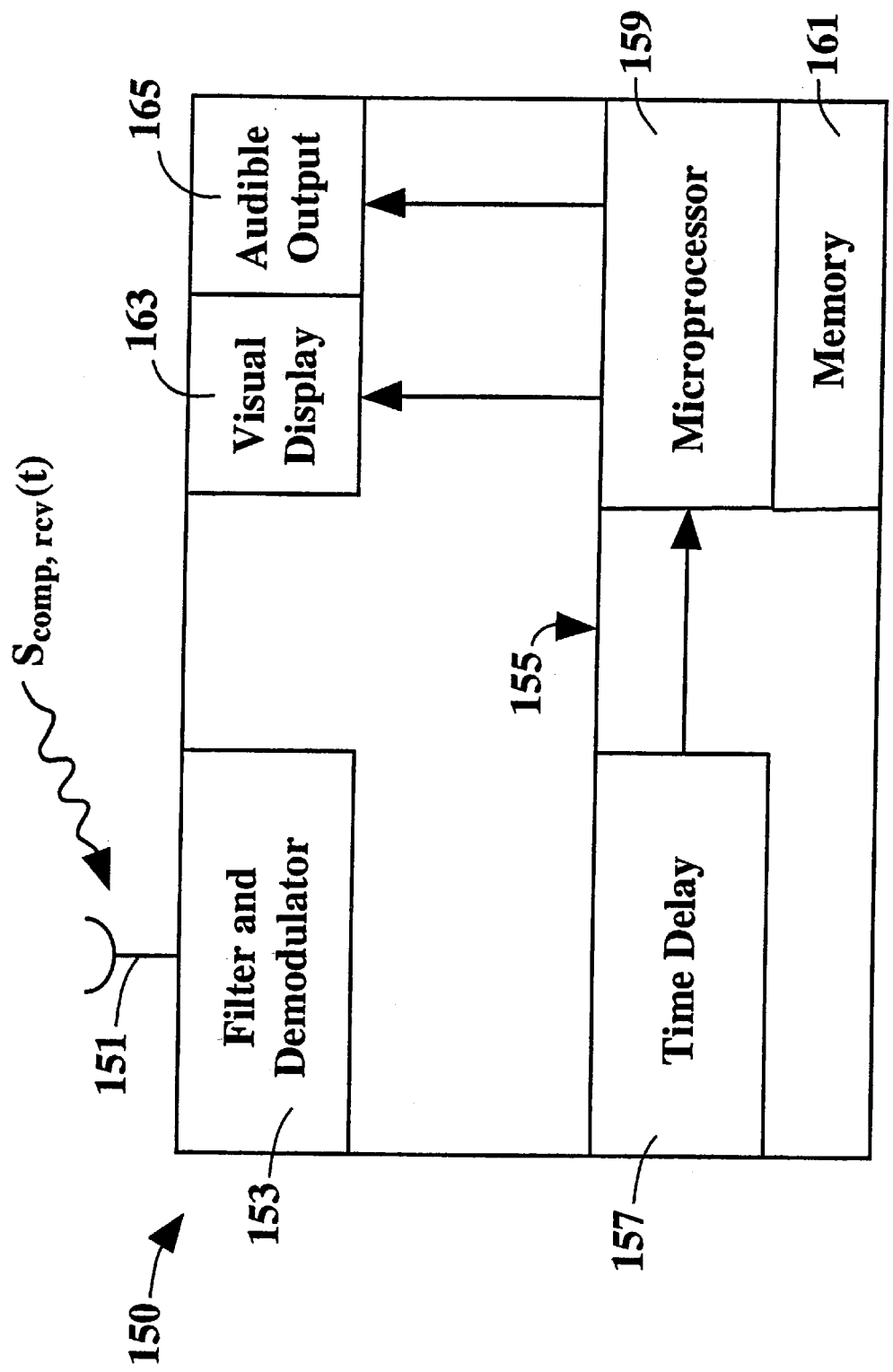
FIGS. 14 and 15 are schematic views of receiver apparatus and transmitter apparatus for practicing the invention.

FIG. 14 illustrates signal receiver apparatus that can be used to practice the invention. A composite signal $S_{comp,rcv}(t)$, containing the direct signal, the indicium signal and possibly multipath signals arising from the direct and indicium signals, is received at a receiver antenna 151 and passed through a signal filter and demodulator 153 (optional) that removes any carrier signal that is present and cleans up the received signal. The received composite signal is then received by a signal processing module 155 that includes a signal delay line 157 (optional), a microprocessor 159 and a memory 161 for the microprocessor. If the incoming signal is to be processed in (near) real time, the received composite signal is routed through the time delay line 157 while signal parameters such as $\tau(i)$, $\tau(d)$, $\tau(i;m)$, $\tau(d;m)$, $\chi(i)$, $\chi(i;m)$ and/or $\chi(d;m)$ are determined by the microprocessor 159 from a separate replica of the received composite signal. An enhanced received composite signal $S_{comp,rcv,enh}(t)$ is constructed, using the analysis associated with FIGS. 9–13, as the received composite signal emerges from the time delay line. If only post-processing is contemplated, the time delay line may be eliminated and the received composite signal values are sampled and stored by the microprocessor in the memory 161. An enhanced composite received signal and parameters can be optionally presented on a visual display module 163 and/or an audio outout module 165.

Figure 15:
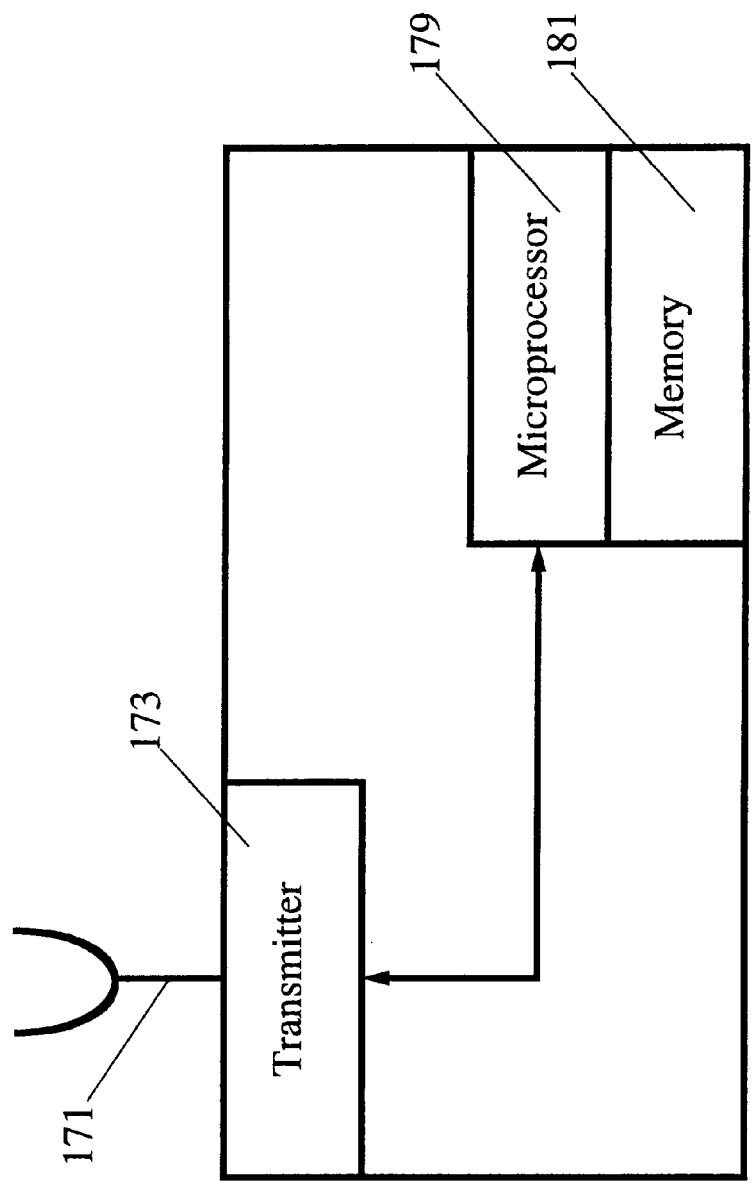

FIG. 15 illustrates signal transmitter apparatus 170 that can be used to practice the invention. The apparatus includes: a transmitter 173 and associated transmitting antenna 171; a microprocessor 179 that is programmed to form a composite signal $S_{comp,trans}(t)$, including a direct signal $S_{d,trans}(t)$ and an indicium signal $S_{i,trans}(t)$, as discussed in the preceding; and a memory 181 that contains instructions for formation of the indicium signal and for combination of the indicium signal with the direct signal to form the composite signal to be transmitted, as discussed in the preceding in connection with FIGS. 2, 3, 4, 5, 7A–7I, 9, 10, 11 and 12.

What is claimed is:

1. A method for discrimination of a multipath signal in a received composite signal that includes a direct, distortion-free signal, the method comprising the steps of:

transmitting a transmitted digital signal that includes a transmitted direct signal with an arbitrary direct signal bit pattern and includes an indicium signal with a selected indicium signal bit pattern whose indicium signal bits are separate from, and form an indicium signal bit pattern that is distinguishable from, the direct signal bits, wherein the indicium signal bit pattern includes a frequency for bit value transitions that is higher than a maximum frequency for bit value transitions for the direct signal bit pattern;

receiving at a signal receiver a received composite digital signal that is a result of propagation of the transmitted digital signal from the source of the transmitted digital signal to the signal receiver, where the received composite digital signal includes received indicium signal bits and received direct signal bits that result from propagation of the indicium signal bits and of the direct signal bits, respectively;

separating the received indicium signal bits from the received composite signal to produce a received remainder signal that includes at least a portion of the received composite signal not including any bits that correspond to the received indicium signal bits;

comparing the received indicium signal bits with bits from a selected reference signal that is substantially a replica of the transmitted indicium signal, and determining a signal modification that will convert the reference signal into the received indicium signal; and applying an inverse of the signal modification to the received remainder signal to determine an enhanced received composite signal that has less signal distortion than the received remainder signal.

2. The method of claim 1, further comprising the step of selecting said indicium signal bit pattern that includes at least one bit pattern that cannot be included in said direct signal bit pattern, based upon a signal protocol that applies to said direct signal bit pattern.

3. A method for discrimination of a multipath signal in a received composite signal that includes a direct, distortion-free signal, the method comprising the steps of:

transmitting a transmitted digital signal that includes a transmitted direct signal with an arbitrary direct signal bit pattern and includes an indicium signal with a selected indicium signal bit pattern whose indicium signal bits form an indicium signal bit pattern that is combined with a selected portion of at least one direct signal bit, wherein the indicium signal bit pattern includes a frequency for bit value transitions that is higher than a maximum frequency for bit value transitions for the direct signal bit pattern;

receiving at a signal receiver a received composite digital signal that is a result of propagation of the transmitted digital signal from the source of the transmitted digital signal to the signal receiver, where the received composite digital signal includes received indicium signal bits and received direct signal bits that result from propagation of the indicium signal bits and of the direct signal bits, respectively;

separating the received indicium signal bits from the received composite signal to produce a received remainder signal that includes at least a portion of the received composite signal not including any bits that correspond to the received indicium signal bits;

comparing the received indicium signal bits with bits from a selected reference signal that is substantially a replica of the transmitted indicium signal, and determining a signal modification that will convert the reference signal into the received indicium signal; and applying an inverse of the signal modification to the received remainder signal to determine an enhanced received composite, signal that has less signal distortion than the received remainder signal.

4. The method of claim 3, further comprising the step of selecting said indicium signal bit pattern that includes at least one bit pattern that cannot be included in said direct signal bit pattern, based upon a signal protocol that applies to said direct signal bit pattern.

5. Apparatus for discrimination of a multipath signal in a received composite signal that includes a direct, distortion-free signal, the apparatus comprising:

a transmitter that transmits a transmitted digital signal that includes a transmitted direct signal with an arbitrary direct signal bit pattern and includes an indicium signal with a selected indicium signal bit pattern whose indicium signal bits are separate from, and form an indicium signal bit pattern that is distinguishable from, the direct signal bits, wherein the indicium signal bit pattern includes a frequency for bit value transitions that is higher than a maximum frequency for bit value transitions for the direct signal bit pattern;

receiving at a signal receiver a received composite digital signal that is a result of propagation of the transmitted digital signal from the source of the transmitted digital signal to the signal receiver, where the received composite digital signal includes received indicium signal bits and received direct signal bits that result from propagation of the indicium signal bits and of the direct signal bits, respectively, the receiver including a computer that is programmed:

to separate the received indicium signal bits from the received composite signal to produce a received remainder signal that includes at least a portion of the received composite signal not including any bits that correspond to the received indicium signal bits;

to compare the received indicium signal bits with bits from a selected reference signal that is substantially a replica of tie transmitted indicium signal, and to determine a signal modification that will convert the reference signal into the received indicium signal; and to apply an inverse of the signal modification to the received remainder signal to determine an enhanced received composite signal that has less signal distortion than the received remainder signal.

6. The method of claim 5, further comprising the step of selecting said indicium signal bit pattern that includes at least one bit pattern that cannot be included in said direct signal bit pattern based upon a signal protocol that applies to said direct signal bit pattern.

7. Apparatus for discrimination of a multipath signal in a received composite signal that includes a direct, distortion-free signal, the method comprising the steps of:

a transmitter that transmits a transmitted digital signal that includes a transmitted direct signal with an arbitrary direct signal bit pattern and includes an indicium signal with a selected indicium signal bit pattern whose indicium signal bits form an indicium signal bit pattern that is combined with a selected portion of at least one direct signal bit, wherein the indicium signal bit pattern includes a frequency for bit value transitions that is higher than a maximum frequency for bit value transitions for the direct bit pattern;

receiving at a signal receiver a received composite digital signal that is a result of propagation of the transmitted digital signal from the source of the transmitted digital signal to the signal receiver, where the received composite digital signal includes received indicium signal bits and received direct signal bits that result from propagation of the indicium signal bits and of the direct signal bits, respectively, the receiver including a computer that is programmed:

to separate the received indicium signal bits from the received composite signal to produce a received remainder signal that includes at least a portion of the received composite signal not including any bits that correspond to the received indicium signal bits;

to compare the received indicium signal bits with bits from a selected reference signal that is substantially a replica of the transmitted indicium signal, and to determine a signal modification that will convert the reference signal into the received indicium signal; and to apply an inverse of the signal modification to the received remainder signal to determine an enhanced received composite signal that has less signal distortion than the received remainder signal.

8. The method of claim 7, further comprising the step of selecting said indicium signal bit pattern that includes at least one bit pattern that cannot be included in said direct signal bit pattern, based upon a signal protocol that applies to said direct signal bit pattern.

9. A method for discrimination of a multipath signal in a received composite signal that includes a direct, distortion-free signal, the method comprising the steps of:

receiving at a signal receiver a received composite digital signal that is a result of propagation of a transmitted digital signal from the source of the transmitted digital signal to the signal receiver, where the received composite digital signal includes a received direct signal and a received indicium signal that is known and that was initially transmitted at a time that is separated from the time the received direct signal was initially transmitted by a known separation time;

separating the received indicium signal from the remainder of the received composite signal, and estimating the time of arrival of the received indicium signal; and estimating the time of arrival of the direct signal, using the estimated time of arrival of the received indicium signal and the known separation time.

10. The method of claim 9, further comprising the steps of:

removing said received indicium signal from said received composite signal to produce a received remainder signal;

processing the received remainder signal to estimate a time of arrival of an indicium multipath signal, if any, that arises from said received indicium signal; and using the estimated time of arrival of the indicium multipath signal and said known separation time to estimate a time of arrival of a direct multipath signal, if any, that arises from said received direct signal.

11. The method of claim 10, further comprising the step of removing said indicium multipath signal from said received remainder signal to produce an enhanced received remainder signal.

12. A method for discrimination of a multipath signal in a received composite signal that includes a direct, distortion-free signal, the method comprising:

transmitting a transmitted digital signal that includes a transmitted direct signal with an arbitrary direct signal bit pattern and includes an indicium signal with a selected indicium signal bit pattern whose indicium signal bits are separate from, and form a bit pattern that is distinguishable from, the direct signal bits, where the indicium signal bit pattern includes a frequency for bit value transitions that is higher than a maximum frequency for bit value transitions for the direct signal bit pattern;

receiving at a signal receiver a received composite digital signal that is a result of propagation of the transmitted digital signal from the source of the transmitted digital signal to the signal receiver, where the received composite digital signal includes received indicium signal bits and received direct signal bits that result from propagation of the indicium signal bits and of the direct signal bits, respectively;

separating the received indicium signal bits from the received composite signal to produce a received remainder signal that includes at least a portion of the received composite signal not including any bits that correspond to the received indicium signal bits;

comparing the received indicium signal bits with bits from a selected reference signal that is substantially a replica of the transmitted indicium signal, and determining a signal modification that will convert the reference signal into the received indicium signal; and applying an inverse of the signal modification to the received remainder signal to determine an enhanced received composite signal that has less signal distortion than the received remainder signal.

13. The method of claim 12, further comprising the steps of:

arranging said direct signal bit pattern in said transmitted signal in a direct signal segment of consecutive bits; and arranging said indicium signal bit pattern in said transmitted signal in an indicium segment of consecutive bits, where the direct segment and the indicium segment are separated by no more than a selected positive maximum separation time.

14. The method of claim 12, further comprising the steps of:

arranging said direct signal bit pattern in at least a first segment of consecutive bits and a second segment of consecutive bits, where the first and second segments of consecutive bits are non-contiguous; and enclosing at least one bit from said indicium signal bit pattern in said transmitted signal between the first and second segments of said direct signal bit pattern in said transmitted signal.

15. The method of claim 12, further comprising the steps of:

arranging said indicium signal bit pattern in at least a first segment of consecutive bits and a second segment of consecutive bits, where the first and second segments of consecutive bits are non-contiguous; and enclosing at least one bit from said direct signal bit pattern in said transmitted signal between the first and second segments of said indicium signal bit pattern in said transmitted signal.

16. The method of claim 12, further comprising including said indicium signal bit pattern with said direct signal bit pattern at a first selected time and at a second selected time, where the first selected time and the second selected time are spaced apart from each other by a separation time that is no greater than a selected positive maximum separation time.

17. A method for discrimination of a multipath signal in a received composite signal that includes a direct, distortion-free signal, the method comprising:

transmitting a transmitted digital signal that includes a transmitted direct signal with an arbitrary direct signal bit pattern and includes an indicium signal with a selected indicium signal bit pattern whose indicium signal bits form a bit pattern that is combined with a selected portion of at least one direct signal bit, where the indicium signal bit pattern includes a frequency for bit value transitions that is higher than a maximum frequency for bit value transitions for the direct signal bit pattern;

receiving at a signal receiver a received composite digital signal that is a result of propagation of the transmitted digital signal from the source of the transmitted digital signal to the signal receiver, where the received composite digital signal includes received indicium signal bits and received direct signal bits that result from propagation of the indicium signal bits and of the direct signal bits, respectively;

separating the received indicium signal bits from the received composite signal to produce a received remainder signal that includes at least a portion of the received composite signal not including any bits that correspond to the received indicium signal bits;

comparing the received indicium signal bits with bits from a selected reference signal that is substantially a replica of the transmitted indicium signal, and determining a signal modification that will convert the reference signal into the received indicium signal; and applying an inverse of the signal modification to the received remainder signal to determine an enhanced received composite signal that has less signal distortion than the received remainder signal.

18. The method of claim 17, further comprising including said indicium signal bit pattern with said direct signal bit pattern at a first selected time and at a second selected time, where the first selected time and the second selected time are spaced apart from each other by a separation tone that is no greater than a selected positive maximum separation time.

19. A method for discrimination of a multipath signal in a received composite signal that includes a direct, distortion-free signal, the method comprising the steps of:

transmitting a transmitted digital signal that includes a transmitted direct signal with an arbitrary direct signal bit pattern and includes an indicium signal with a selected indicium signal bit pattern whose indicium signal bits form a pattern that is combined with a selected portion of at least one direct signal bit, where the combination of the indicium signal bit pattern and the at least one direct signal bit comprises at least one Boolean combination of the value of each of the indicium signal bits with a bit value of the at least one direct signal bit and each Boolean combination is superimposed on the selected portion of the at least one direct signal bit, where the Boolean combination is drawn from the class of Boolean combinations consisting of Boolean sum, Boolean complement of Boolean sum, Boolean product, Boolean complement of Boolean product, EXclusive OR and EXclusive NOR;

receiving at a signal receiver a received composite digital signal that is a result of propagation of the transmitted digital signal from the source of the transmitted digital signal to the signal receiver, where the received composite digital signal includes received indicium signal bits and received direct signal bits that result from propagation of the indicium signal bits and of the direct signal bits, respectively;

separating the received indicium signal bits from the received composite signal to produce a received remainder signal that includes at least a portion of the received composite signal not including any bits that correspond to the received indicium signal bits;

comparing the received indicium signal bits with bits from a selected reference signal that is substantially a replica of it transmitted indicium signal, and determining a signal modification that will convert the reference signal into the received indicium signal; and applying an inverse of the signal modification to the received remainder signal to determine an enhanced received composite signal that has less signal distortion than the received remainder signal.

20. The method of claim 19, further comprising including said indicium signal bit pattern with said direct signal bit pattern at a first selected dime and at a second selected time, where the first selected time and the second selected time are spaced apart from each other by a separation time that is no greater than a selected positive maximum separation time.

21. Apparatus for discrimination of a multipath signal in a received composite signal that includes a direct, distortion-free signal, the apparatus comprising:

a signal transmitter that transmits a transmitted digital signal that includes a transmitted direct signal with an arbitrary direct signal bit pattern and includes an indicium signal with a selected indicium signal bit pattern whose indicium signal bits ate separate from, and form a bit pattern that is distinguishable from, the direct signal bits, where the indicium signal bit pattern includes a frequency for bit value transitions that is higher than a maximum frequency for bit value transitions for the direct signal bit pattern;

a signal receiver that receives a composite digital signal that is a result of propagation of the transmitted digital signal from the source of the transmitted digital signal to the signal receiver, where the received composite digital signal includes received indicium signal bits and received direct signal bits that result from propagation of the indicium signal bits and of the direct signal bits, respectively, the receiver including a computer that is progammed:

to separate the received indicium signal bits from the received composite signal to produce a received remainder signal that includes at least a portion of the received composite signal not including any bits that correspond to the received indicium signal bits;

to compare the received indicium signal bits with bits from a selected reference signal that is substantially a replica of the transmitted indicium signal, and to determine a signal modification that will convert the reference signal into the received indicium signal; and to apply an inverse of the signal modification to the received remainder signal to determine an enhanced received composite signal that has less signal distortion than the received remainder signal.

22. The apparatus of claim 21, wherein said transmitter includes said indicium signal bit pattern with said direct signal bit pattern at a first selected time and at a second selected time, where the first selected time and the second selected time are spaced apart from each other by a separation time tat is no greater than a selected positive maximum separation time.

23. Apparatus for discrimination of a multipath signal in a received composite signal that includes a direct, distortion-free signal, the apparatus comprising:

a transmitter that transmits a transmitted digital signal that includes a transmitted direct signal with an arbitrary direct signal bit pattern and includes an indicium signal with a selected indicium signal bit pattern whose indicium signal bits are separate from, and form a pattern that is distinguishable from, the direct signal bits;

a signal receiver that receives a composite digital signal that is a result of propagation of the transmitted digital signal from the source of the transmitted digital signal to the signal receiver, where the received composite digital signal includes received indicium signal bits and received direct signal bits that result from propagation of the indicium signal bits and of the direct signal bits, respectively, the receiver including a computer that is programmed:

to separate the received indicium signal bits from the received composite signal to produce a received remainder signal that includes at least a portion of the received composite signal not including any bits that correspond to the received indicium signal bits;

to compare the received indicium signal bits with bits from a selected reference signal that is substantially a replica of the transmitted indicium signal, and to determine a signal modification that will convert the reference signal into the received indicium signal; and to apply an inverse of the signal modification to the received remainder signal to determine an enhanced received composite signal that has less signal distortion than the received remainder signal; and a signal time delay line connected to at least cane of the signal receiver and the computer, to receive the received composite signal and to issue the received composite signal with a selected time delay so that the enhanced received composite signal can be determined in real time.

24. The apparatus of claim 23, wherein said transmitter includes said indicium signal bit pattern with said direct signal bit pattern at a first selected time and at a second selected time, where the first selected time and the second selected time are spaced apart from each other by a separation time that is no greater than a selected positive maximum separation time.

25. Apparatus for discrimination of a multipath signal in a received composite signal that includes a direct, distortion-fee signal, the method comprising the steps of:

a transmitter that transmits a transmitted digital signal that includes a transmitted direct signal with an arbitrary direct signal bit pattern and includes an indicium signal with a selected indicium signal bit pattern whose indicium signal bits form a bit pattern that is combined with a selected portion of at least one direct signal bit, wherein the indicium signal bit pattern includes a frequency for bit value transitions that is higher than a maximum frequency for bit value transitions for the direct signal bit pattern;

a signal receiver that receives a composite digital signal that is a result of propagation of the transmitted digital signal from the source of the transmitted digital signal to the signal receiver, where the received composite digital signal includes received indicium signal bits and received direct signal bits that result from propagation of the indicium signal bits and of the direct signal bits, respectively, the receiver including a computer that is programmed:

to separate the received indicium signal bits from the received composite signal to produce a received remainder signal that includes at least a portion of the received composite signal not including any bits that correspond to the received indicium signal bits;

to compare the received indicium signal bits with bits from a selected reference signal that is substantially a replica of the transmitted indicium signal, and to determine a signal modification that will convert the reference signal into the received indicium signal; and to apply an inverse of the signal modification to the received remainder signal to determine an enhanced received composite signal that has less signal distortion than the received remainder signal.

26. The apparatus of claim 25, wherein said transmitter includes said indicium signal bit pattern with said direct signal bit pattern at a first selected time and at a second selected time, where the first selected time and the second selected time are spaced apart from each other by a separation time that is no greater than a selected positive maximum separation time.

27. The apparats of claim 25, wherein said transmitter includes said indicium signal bit pattern with said direct signal bit pattern at a first selected time and at a second selected time, where the first selected time and the second selected time are spaced apart from each other by a separation time that is no greater than a selected positive maximum separation time.

28. Apparatus for discrimination of a multipath signal in a received composite signal that includes a direct, distortion-free signal, the method comprising the steps of:

a transmitter that transmits a transmitted digital signal that includes a transmitted direct signal with an arbitrary direct signal bit pattern and includes an indicium signal with a selected indicium signal bit pattern whose indicium signal bits form an indicium signal bit pattern that is combined with a selected portion of at least one direct signal bit, where the combination of the indicium signal bit pattern and the at least one direct signal bit comprises at least one Boolean combination of the value of each of the indicium signal bits with a bit value of the at least one direct signal bit and each Boolean combination is superimposed on the selected portion of the at least one direct signal bit, where the Boolean combination is drawn from the class of Boolean combinations consisting of Boolean sum, Boolean complement of Boolean sum, Boolean product, Boolean complement of Boolean product, EXclusive OR anti EXclusive NOR;

receiving at a signal receiver a received composite digital signal that is a result of propagation of the transmitted digital signal from the source of the transmitted digital signal to the signal receiver, where the received composite digital signal includes received indicium signal bits and received direct signal bits that result from propagation of the indicium signal bits and of the direct signal bits, respectively, the receiver including a computer that is programmed:

to separate the received indicium signal bits from the received composite signal to produce a received remainder signal that includes at least a portion of the received composite signal not including any bits that correspond to the received indicium signal bits;

to compare the received indicium signal bits with bits from a selected reference signal that is substantially a replica of the transmitted indicium signal, and to determine a signal modification that will convert the reference signal into the received indicium signal; and to apply an inverse of the signal modification to the received remainder signal to determine an enhanced received composite signal that has less signal distortion than the received remainder signal.

29. Apparatus for discrimination of a multipath signal in a received composite signal that includes a direct, distortion-free signal, the method comprising the steps of:

a transmitter that transmits a transmitted digital signal that includes a transmitted direct signal with an arbitrary direct signal bit pattern and includes an indicium signal bits with a selected indicium signal bit pattern whose indicium signal bits form an indicium signal bit pattern that is combined with a selected portion of at least one direct signal bit;

receiving at a signal receiver a received composite digital signal that is a result of propagation of the transmitted digital signal from the source of the transmitted digital signal to the signal receiver, where the received composite digital signal includes received indicium signal bits and received direct signal bits that result from propagation of the indicium signal bits and of the direct signal bits, respectively, the receiver including a computer that is programmed:

to separate the received indicium signal bits from the received composite signal to produce a received remainder signal that includes at least a portion of the received composite signal not including any bits that correspond to the received indicium signal bits;

to compare the received indicium signal bits with bits from a selected reference signal that is substantially a replica of the transmitted indicium signal, and to determine a signal modification that will convert the reference signal into the received indicium signal; and to apply an inverse of the signal modification to the received remainder signal to determine an enhanced received composite signal that has less signal distortion than the received remainder signal; and a signal time delay line connected to at least one of the signal receiver and the computer, to receive the received composite signal and to issue the received composite signal with a selected time delay so that the enhanced received composite signal can be determined in real time.

30. The apparatus of claim 29, wherein said transmitter includes said indicium signal bit pattern with said direct signal bit pattern at a first selected time and at a second selected time, where the first selected time and the second selected time are spaced apart from each other by it separation time that is no greater than a selected positive maximum separation time.

* * * * *